US010777057B1

(12) United States Patent
Siminoff

(10) Patent No.: US 10,777,057 B1
(45) Date of Patent: Sep. 15, 2020

(54) PREMISES SECURITY SYSTEM WITH AUDIO SIMULATING OCCUPANCY

(71) Applicant: AMAZON TECHNOLOGIES, INC., Seattle, WA (US)

(72) Inventor: James Siminoff, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/203,470

(22) Filed: Nov. 28, 2018

Related U.S. Application Data

(60) Provisional application No. 62/593,000, filed on Nov. 30, 2017.

(51) Int. Cl.
| | | |
|---|---|---|
| *G08B 15/00* | (2006.01) | |
| *H04R 5/04* | (2006.01) | |
| *H04N 7/18* | (2006.01) | |
| *H04S 7/00* | (2006.01) | |
| *H04R 3/12* | (2006.01) | |

(52) U.S. Cl.
CPC .......... *G08B 15/002* (2013.01); *H04N 7/186* (2013.01); *H04R 3/12* (2013.01); *H04R 5/04* (2013.01); *H04S 7/301* (2013.01)

(58) Field of Classification Search
CPC ........ G08B 15/002; H04N 7/186; H04R 3/12; H04R 5/04; H04S 7/301
See application file for complete search history.

(56) References Cited

U.S. PATENT DOCUMENTS

| | | |
|---|---|---|
| 4,764,953 A | 8/1988 | Chern et al. |
| 5,428,388 A | 6/1995 | Von Bauer et al. |
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |

(Continued)

FOREIGN PATENT DOCUMENTS

| | | |
|---|---|---|
| CN | 2585521 Y | 11/2003 |
| CN | 2792061 Y | 6/2006 |

(Continued)

*Primary Examiner* — Joseph H Feild
*Assistant Examiner* — Rufus C Point
(74) *Attorney, Agent, or Firm* — Lathrop GPM LLP

(57) ABSTRACT

A premises security system for providing audio simulating occupancy of a premises. The system includes a video doorbell having a presence sensor and a security hub component communicatively coupled with the video doorbell. The security hub component includes a microphone for capturing sound within the premises, at least one speaker positioned within the premises, an audio driver for driving the speaker, a storage device, and a processor coupled to the microphone, the storage device, and the audio driver. The processor executes machine-readable instructions that control the processor to: capture, using the microphone, audio content of sounds within the premises; store the audio content in the storage device; and control the audio driver to play the audio content through the speaker in response to receiving an indication of the presence of a visitor from the video doorbell.

18 Claims, 15 Drawing Sheets

(56) References Cited

U.S. PATENT DOCUMENTS

| | | |
|---|---|---|
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 6/2006 | Lee |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,350,694 B1 * | 1/2013 | Trundle .................. G08B 25/08 340/539.11 |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,600,645 B2 * | 3/2017 | Fadell .................. G06F 21/44 |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 9,888,216 B2 * | 2/2018 | Scalisi .................. H04N 7/186 |
| 9,940,801 B2 * | 4/2018 | Phillips .................. H04L 67/12 |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2008/0186149 A1 * | 8/2008 | Readler .................. G08B 15/002 340/309.16 |
| 2011/0157327 A1 * | 6/2011 | Seshadri .................. H04N 21/435 348/51 |
| 2012/0250834 A1 * | 10/2012 | Smith .................. G08B 25/006 379/45 |
| 2013/0057695 A1 | 3/2013 | Huisking |
| 2014/0136379 A1 * | 5/2014 | Smith .................. G08B 29/00 705/34 |
| 2015/0035987 A1 | 2/2015 | Fernandez |
| 2015/0109104 A1 * | 4/2015 | Fadell .................. H04L 67/12 340/5.65 |
| 2015/0112885 A1 * | 4/2015 | Fadell .................. G08B 25/008 705/330 |
| 2017/0034485 A1 * | 2/2017 | Scalisi .................. G07C 9/00309 |
| 2017/0163944 A1 * | 6/2017 | Jeong .................. G01J 5/0025 |
| 2017/0195639 A1 * | 7/2017 | Gluckman .......... H04N 21/2407 |
| 2017/0272653 A1 * | 9/2017 | Siminoff .............. G08B 13/196 |
| 2017/0332055 A1 * | 11/2017 | Henderson ............. H04N 7/186 |
| 2018/0026808 A1 * | 1/2018 | Scalisi .............. H04L 12/40169 340/5.5 |
| 2018/0046864 A1 * | 2/2018 | Flint .................. H04N 5/247 |
| 2018/0114430 A1 * | 4/2018 | Westmacott ......... G08B 29/183 |
| 2018/0139332 A1 * | 5/2018 | Kerzner .................. H04M 11/045 |
| 2018/0350219 A1 * | 12/2018 | Correnti .................. G08B 25/08 |

FOREIGN PATENT DOCUMENTS

| | | | |
|---|---|---|---|
| EP | 0944883 B1 | 6/1998 | |
| EP | 1480462 A1 | 11/2004 | |
| GB | 2184277 A * | 6/1987 | ............ G08B 15/00 |
| GB | 2286283 A | 8/1995 | |
| GB | 2354394 A | 3/2001 | |
| GB | 2357387 A | 6/2001 | |
| GB | 2400958 A | 10/2004 | |
| JP | 2001-103463 A2 | 4/2001 | |
| JP | 2002-033839 A2 | 1/2002 | |
| JP | 2002-125059 A2 | 4/2002 | |
| JP | 2002-342863 A2 | 11/2002 | |
| JP | 2002-344640 A2 | 11/2002 | |
| JP | 2002-354137 A2 | 12/2002 | |
| JP | 2002-368890 A2 | 12/2002 | |
| JP | 2003-283696 A2 | 10/2003 | |
| JP | 2004-128835 A | 4/2004 | |
| JP | 2005-341040 A | 12/2005 | |
| JP | 2006-147650 A | 6/2006 | |
| JP | 2006-262342 A | 9/2006 | |
| JP | 09-008925 A | 1/2009 | |
| WO | WO 199839894 A1 | 9/1998 | |
| WO | WO 0113638 A1 | 2/2001 | |
| WO | WO 200193220 A1 | 12/2001 | |
| WO | WO 2002085019 A1 | 10/2002 | |
| WO | WO 2003028375 A1 | 4/2003 | |
| WO | WO 2003096696 A1 | 11/2003 | |
| WO | WO 2006038760 A1 | 4/2006 | |
| WO | WO 2006067782 A1 | 6/2006 | |
| WO | WO 2007125143 A1 | 8/2007 | |

* cited by examiner

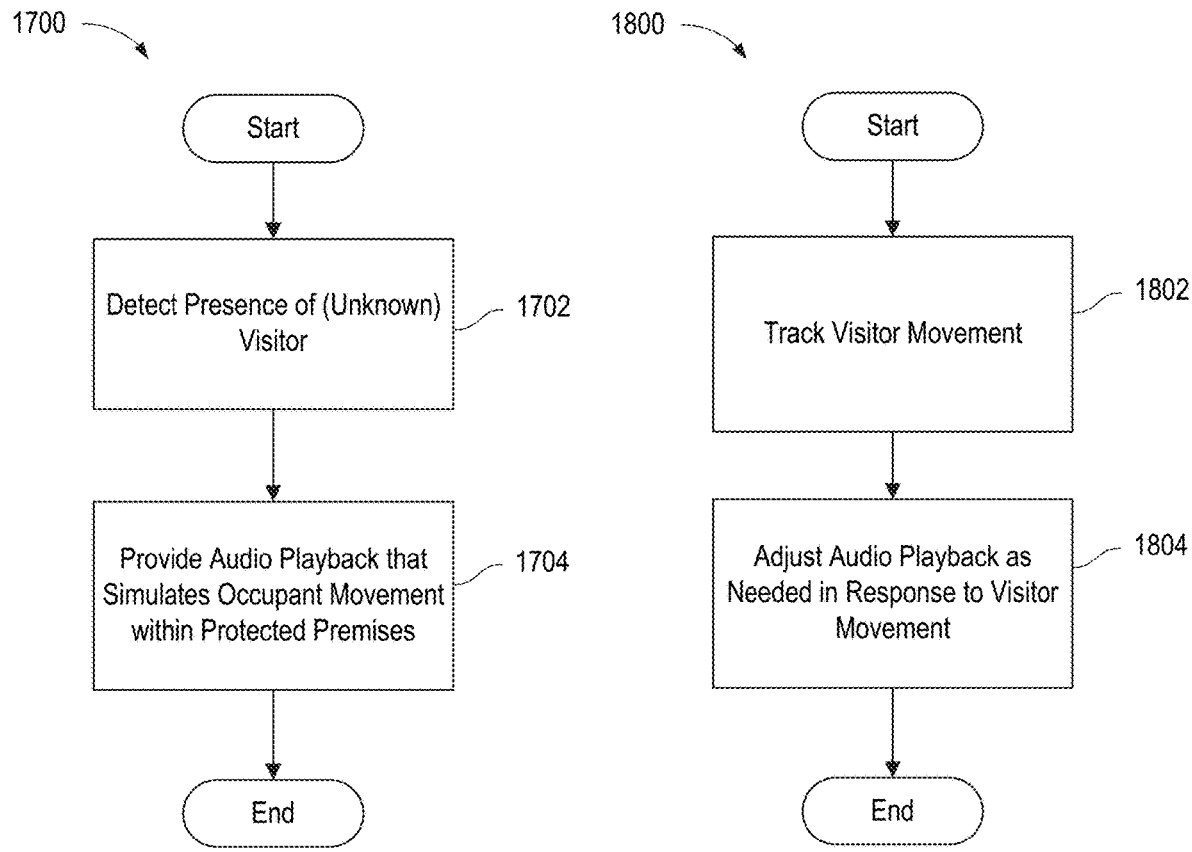
Figure 17
Figure 18
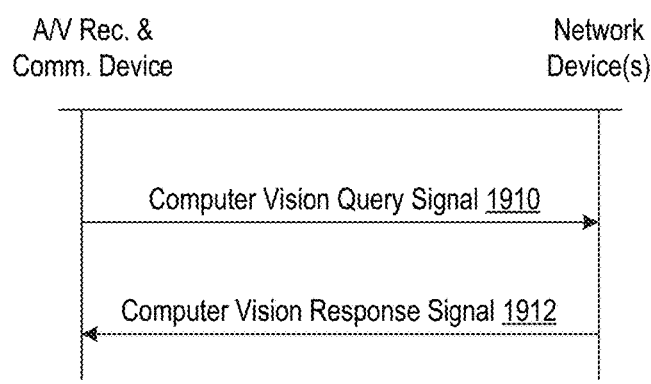
Figure 19

PREMISES SECURITY SYSTEM WITH AUDIO SIMULATING OCCUPANCY

RELATED APPLICATION

This application claims priority to U.S. Patent Application Ser. No. 62/593,000, titled "Premises Security System Configured to Provide Audio Simulating Occupancy," filed on Nov. 30, 2017, and incorporated herein by reference in its entirety.

TECHNICAL FIELD

The present disclosure relates to premises security systems. In particular, the present embodiments relate to improvements in the functionality of premises security systems that increase the security of premises at which such systems are deployed.

BACKGROUND

Home security is a concern for many homeowners and renters. Those seeking to protect or monitor their homes often wish to have video and audio communications with visitors, for example, those visiting an external door or entryway. Audio/video (A/V) recording and communication devices (A/V devices), such as video doorbells, provide this functionality. For example, A/V devices may be used to receive notification, while on premises or away from the premises, that a person is at the door; to see video or other images of the person; and to communicate with the person via audio (voice) communication. Audio and/or video captured by an A/V device can be uploaded to the cloud and recorded on a remote server. The presence of one or more A/V devices on the exterior of a home, such as a doorbell unit at the entrance to the home, acts as a powerful deterrent against would-be burglars.

BRIEF DESCRIPTION OF THE FIGURES

The various embodiments of the present premises security system configured to provide audio content simulating occupancy now will be discussed in detail with an emphasis on highlighting the advantageous features. These embodiments depict the novel and non-obvious premises security system configured to provide audio content simulating occupancy shown in the accompanying drawings, which are for illustrative purposes only. These drawings include the following figures, in which like numerals indicate like parts:

FIGS. 17 and 18 are flowcharts illustrating processes for providing audio content simulating occupancy according to aspects of the present disclosure;

FIG. 19 is a sequence diagram illustrating an embodiment of a process for performing computer vision analysis with respect to video capture by an A/V device according to various aspects of the present disclosure;

DETAILED DESCRIPTION OF THE EMBODIMENTS

Figure 1:
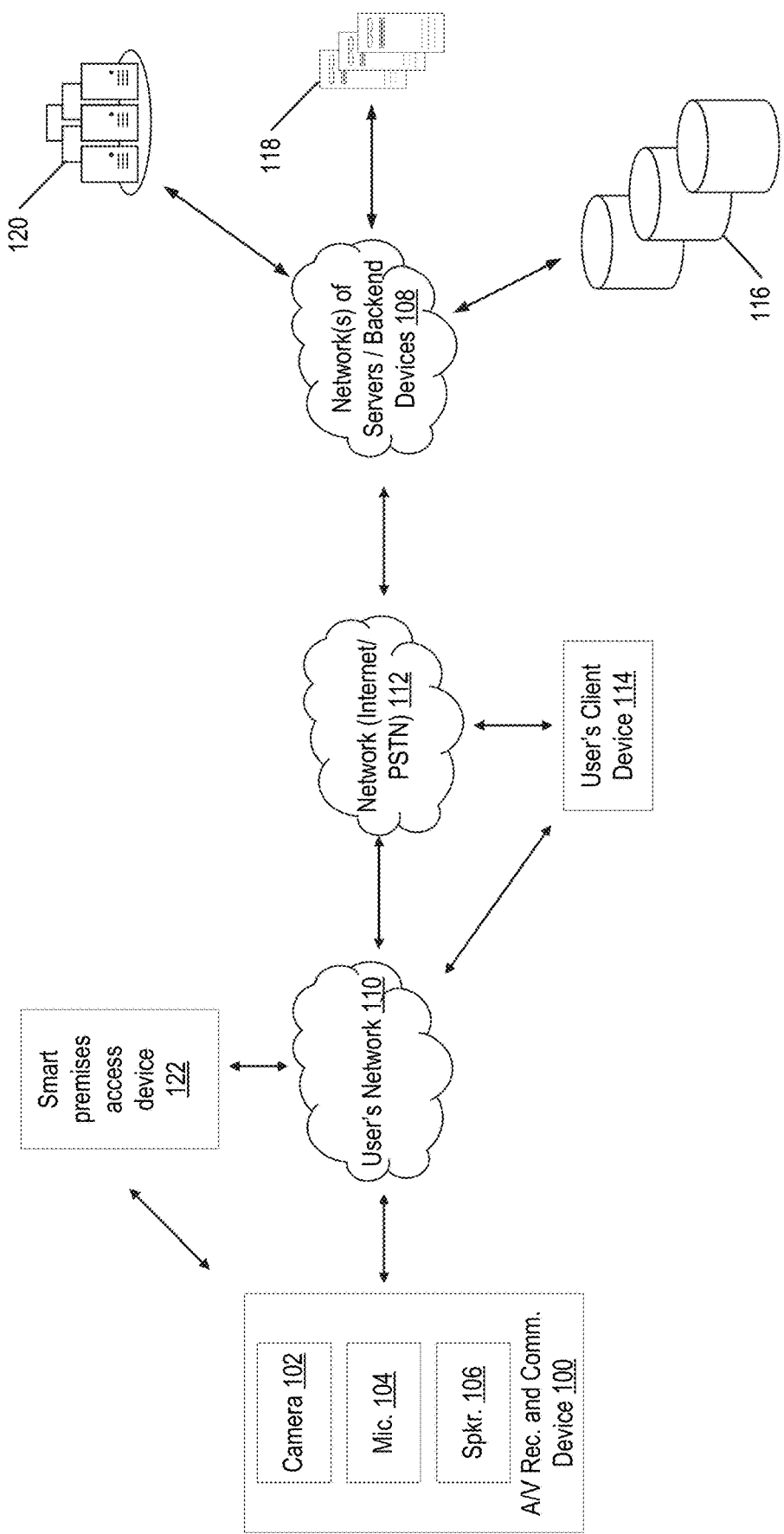
FIG. 1 is a functional block diagram illustrating a system for streaming and storing A/V content captured by an audio/video (A/V) recording and communication device (A/V device) according to various aspects of the present disclosure.

The present embodiments can be implemented in numerous ways, including as a process; an apparatus; a system; a computer program product embodied on a computer-readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the present embodiments. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments is provided below along with accompanying figures that illustrate the principles of the present embodiments. The present invention is described in connection with such embodiments, but the present invention is not limited to any embodiment. The scope of the present invention is limited only by the claims, and the present invention encompasses numerous alternatives, modifications, and equivalents. Numerous specific details are set forth in the following description in order to provide a thorough understanding of the present invention. These details are provided for the purpose of example, and the present invention may be practiced without some or all of these specific details.

The present disclosure describes several solutions to the problem of providing security at least in part by leading a visitor to believe the premises is or may occupied even if it is not currently occupied. In various embodiments, a premises security system as disclosed herein provides audio content simulating occupancy. In various embodiments, audio/video (A/V) recording and communication devices (A/V devices), including without limitation A/V doorbells, security cameras, and floodlight controllers, may be used to detect the approach and/or presence of a visitor, determine that the visitor is an unknown or unwanted visitor, provide playback of audio content simulating occupancy, monitor and adjust sound levels of playback of audio content simulating occupancy, capture and classify audio content associated with occupancy, characterize a visitor to determine one or more attributes, and/or select audio content for playback based on such attributes. In some embodiments, audio content simulating occupancy may be played back via one or more speakers. Movement within the premises of a simulated source of the audio content may be simulated, e.g., by playing content on different speakers and/or using stereophonic and/or audio mixing techniques to simulate movement of a sound source through the interior of a structure at the premises.

In various embodiments, a premises security system to provide audio content simulating occupancy as disclosed herein may use one or more A/V devices mounted at locations around the exterior of a structure at the premises to capture and record ambient sounds during periods in which the premises is occupied. In some embodiments, exterior sound levels may be detected and/or recorded using such A/V devices, and the sounds themselves may be captured and recorded using microphones inside the structure at the premises. On later playback, microphones of A/V devices around the exterior of the structure may be used to monitor sound levels around the exterior of audio being played back using one or more speakers inside the structure. In various embodiments, the speaker(s) inside the structure may be associated with a premises security hub, another node on a premises security network, and/or may be an accessory associated with and driven by such a hub or node. In some embodiments, A/V devices located inside the structure may be used to capture audio during actual occupancy and/or used for later playback to simulate occupancy.

Examples of A/V devices (and associated elements) used in various embodiments in connection with a premises security system to provide audio content simulating occupancy as disclosed herein are described below in connection with FIGS. 1 through 10.

With reference to FIG. 1, the present embodiments include an audio/video (A/V) recording and communication device 100 (A/V device 100). While the present disclosure provides numerous examples of methods and systems including A/V doorbells, the present embodiments are equally applicable for A/V devices other than doorbells. For example, the present embodiments may include one or more A/V security cameras instead of, or in addition to, one or more A/V doorbells. An example A/V security camera may include substantially all of the structure and/or functionality of the doorbells described herein, but without the front button and related components. In another example, the present embodiments may include one or more A/V floodlight controllers instead of, or in addition to, one or more A/V doorbells.

The A/V device 100 may be located near the entrance to a structure (not shown), such as a dwelling, a business, a storage facility, etc., and/or at locations around the exterior area or perimeter around the premises. The A/V device 100 includes a camera 102, a microphone 104, and a speaker 106. The camera 102 may comprise, for example, a high definition (HD) video camera, such as one capable of capturing video images at an image display resolution of 720p, or 1080p, or any other image display resolution. While not shown, the A/V device 100 may also include other hardware and/or components, such as a housing, a communication module (which may facilitate wired and/or wireless communication with other devices), one or more motion sensors (and/or other types of sensors), a button, etc. The A/V device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth. Each of the camera 102, the microphone 104, and any motion sensor disclosed herein is an example of a presence sensor.

With further reference to FIG. 1, the A/V device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V device 100 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone.

The A/V device 100 may communicate with one or more smart premises access devices 122, directly and/or via the user's network 110. The smart premises access devices 122 may comprise, for example, a smart door lock configured to unlock a door, e.g., upon receipt of a verified unlock signal. For example, the smart premises access device 122 may supply a voltage to a solenoid or other electromechanical mechanism to unlock a door, gate, or other portal. In various embodiments, the smart premises access device 122 may disarm an alarm, electric or electronic fence, and/or some other access control and/or detection mechanism or feature.

In various embodiments, the A/V device 100 may communicate with the smart premises access device 122 through a network communication sent via the user's network 110. In some embodiments, the A/V device 100 may communicate directly with the smart premises access device 122, e.g., via a peer-to-peer network connection, Bluetooth or other near-field communication, a wired connection, etc. In some embodiments, the smart premises access device 122 and/or the functionality thereof may be integrated into and provided by the A/V device 100 and/or a peripheral device or components associated with and/or otherwise comprising the A/V device 100.

In various embodiments the A/V device 100 is configured to be used in connection with a premises security system providing audio content simulating occupancy as disclosed herein. For example, video or other image data generated by the A/V device 100 may be used to perform facial recognition to determine whether a visitor is recognized as an authorized person. If not, in an armed state the premises security system may respond to the approach of the unknown visitor by beginning to play audio content simulating occupancy. In some embodiments, a A/V devices, such as A/V device 100, may be used to determine an attribute of an approaching visitor, and the determined attribute may be used to select content associated with that attribute. In some embodiments, a microphone of an A/V device, such as the A/V device 100, may be used to monitor exterior sound levels resulting from playback via one or more speakers inside the premises. For example, higher than usual ambient noise may result in sound levels of the one or more speakers inside the premises being too low to be audible to the approaching visitor. In such a circumstance, the premises security system may increase the audio level at which the audio content simulating occupancy is played back.

The A/V device 100 may also communicate, via the user's network 110 and the network 112 (Internet/PSTN), with a network(s) 108 of servers and/or backend devices, such as (but not limited to) one or more remote storage devices 116 (may be referred to interchangeably as "cloud storage device(s)"), one or more backend servers 118, and one or more backend APIs 120. While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V device 100, the A/V device 100 detects the visitor's presence and begins capturing video images within a field of view of the camera 102. The A/V communication device 100 may also capture audio through the microphone 104. The A/V device 100 may detect the visitor's presence by detecting motion using the camera 102 and/or a motion sensor, and/or by detecting that the visitor has pressed a front button of the A/V device 100 (if the A/V device 100 is a doorbell).

In response to the detection of the visitor, the A/V device 100 sends an alert to the user's client device 114 (FIG. 1) via the user's network 110 and the network 112. The A/V device 100 also sends streaming video, and may also send streaming audio, to the user's client device 114. If the user answers the alert, two-way audio communication may then occur between the visitor and the user through the A/V device 100 and the user's client device 114. The user may view the visitor throughout the duration of the call, but the visitor cannot see the user (unless the A/V device 100 includes a display, which it may in some embodiments).

The video images captured by the camera 102 of the A/V device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
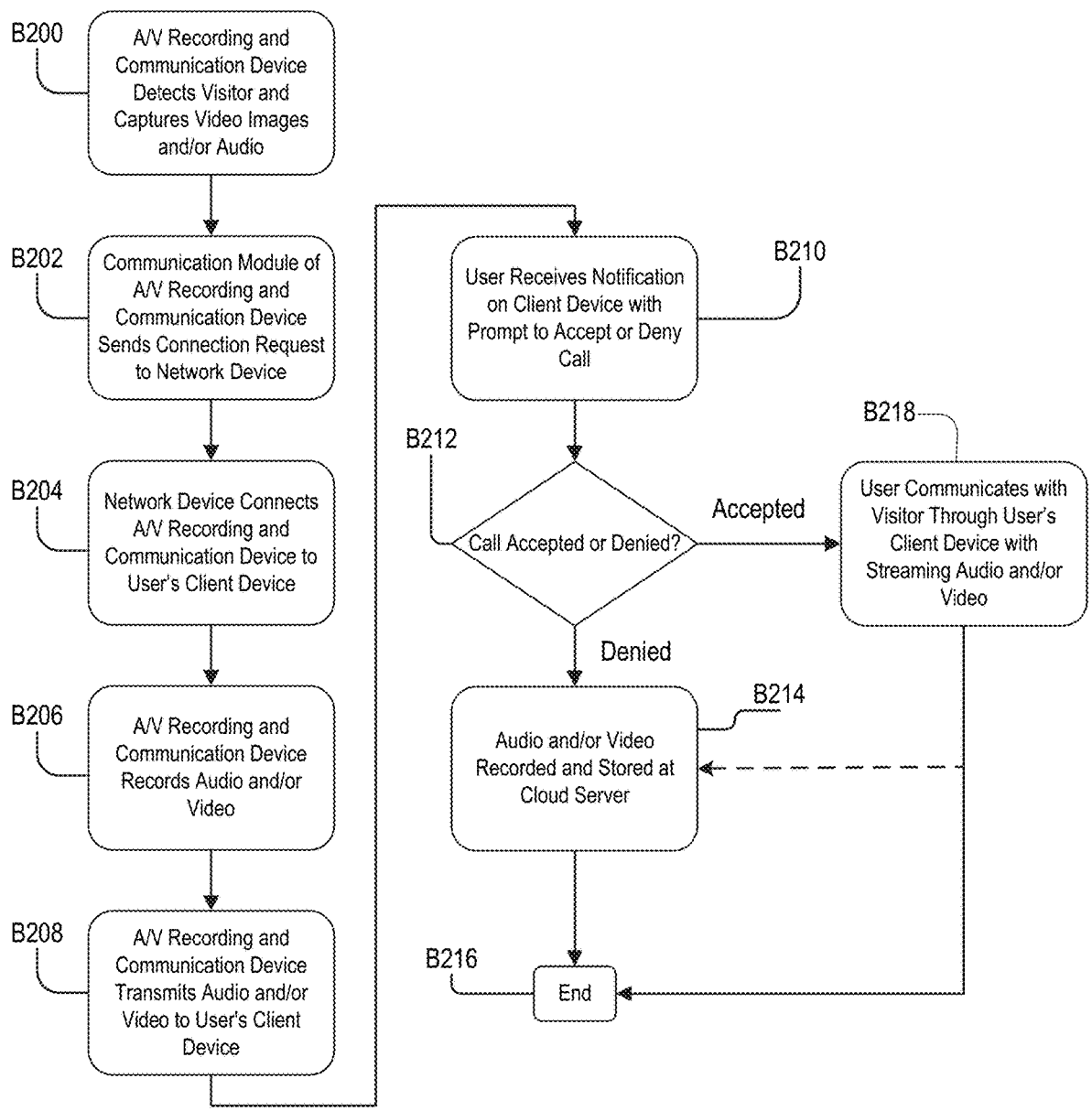
FIG. 2 is a flowchart illustrating a process for streaming and storing A/V content from an A/V device according to various aspects of the present disclosure.

FIG. 2 is a flowchart illustrating a process for streaming and storing A/V content from the A/V device 100 according to various aspects of the present disclosure. At block B200, the A/V device 100 detects the visitor's presence and captures video images within a field of view of the camera 102. The A/V device 100 may also capture audio through the microphone 104. As described above, the A/V device 100 may detect the visitor's presence by detecting motion using the camera 102 and/or a motion sensor, and/or by detecting that the visitor has pressed a front button of the A/V device 100 (if the A/V device 100 is a doorbell). Also as described above, the video recording/capture may begin when the visitor is detected, or may begin earlier, as described below.

At block B202, a communication module of the A/V device 100 sends a connection request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block B204 the network device may connect the A/V device 100 to the user's client device 114 through the user's network 110 and the network 112. At block B206, the A/V device 100 may record available audio and/or video data using the camera 102, the microphone 104, and/or any other device/sensor available. At block B208, the audio and/or video data is transmitted (streamed) from the A/V device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V device 100 and the user's client device 114 is terminated. If, however, the user accepts the notification, then at block B218 the user communicates with the visitor through the user's client device 114 while audio and/or video data captured by the camera 102, the microphone 104, and/or other devices/sensors is streamed to the user's client device 114. At the end of the call, the user may terminate the connection between the user's client device 114 and the A/V device 100 and the session ends at block B216. In some embodiments, the audio and/or video data may be recorded and stored at a cloud server (block B214) even if the user accepts the notification and communicates with the visitor through the user's client device 114.

Figure 4:
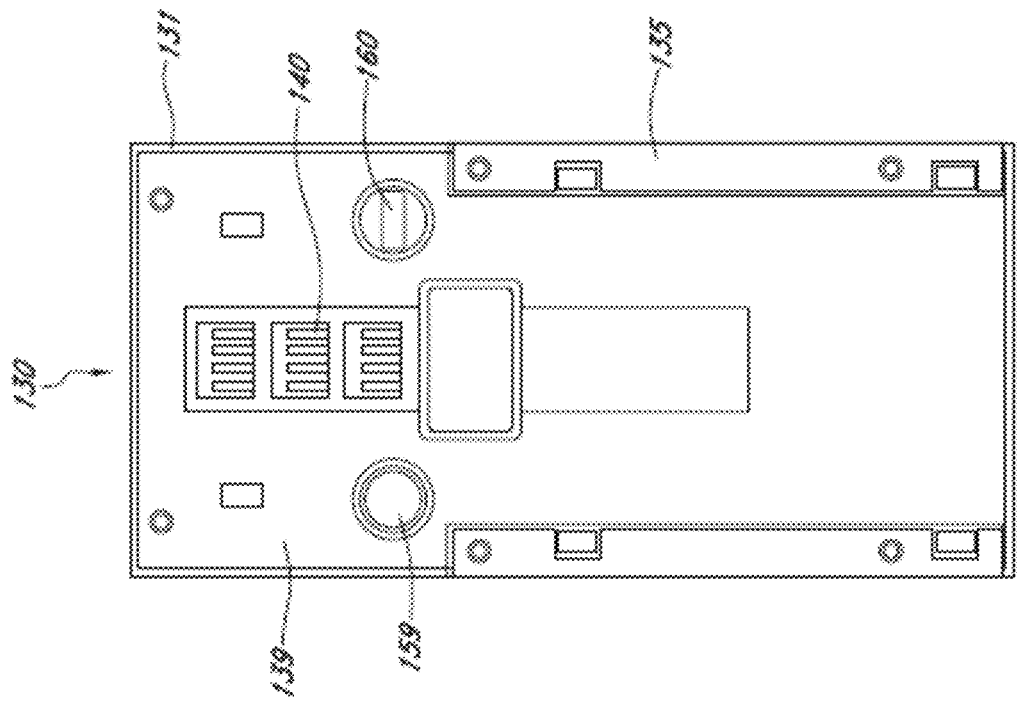
FIG. 4 is a rear view of the A/V doorbell of FIG. 3.
Figure 3:
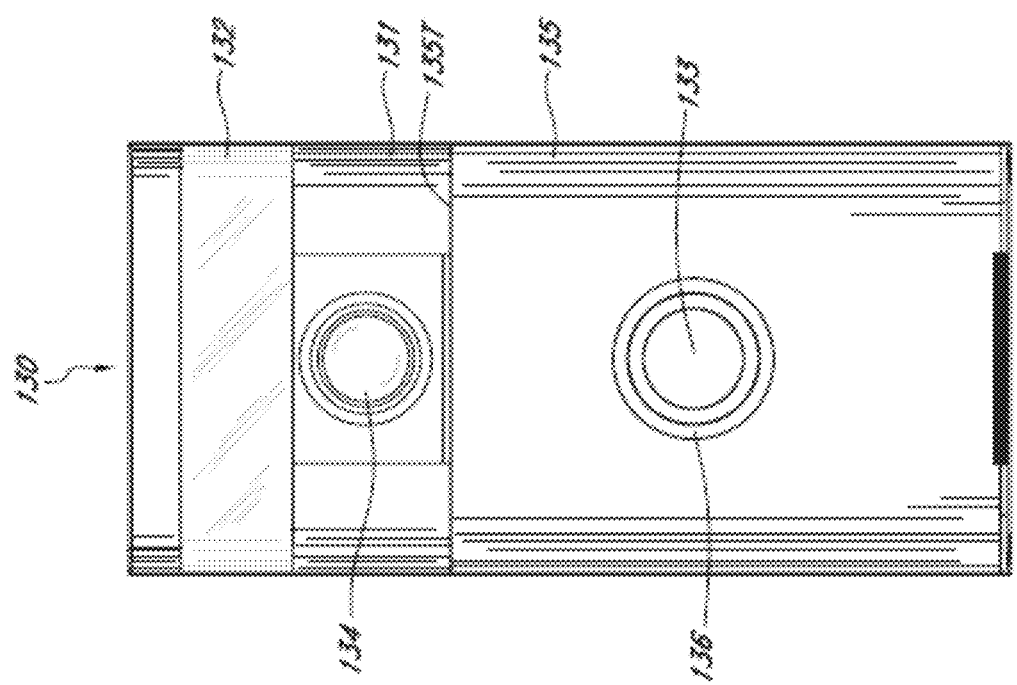
FIG. 3 is a front view of an A/V doorbell according to various aspects of the present disclosure.
Figure 5:
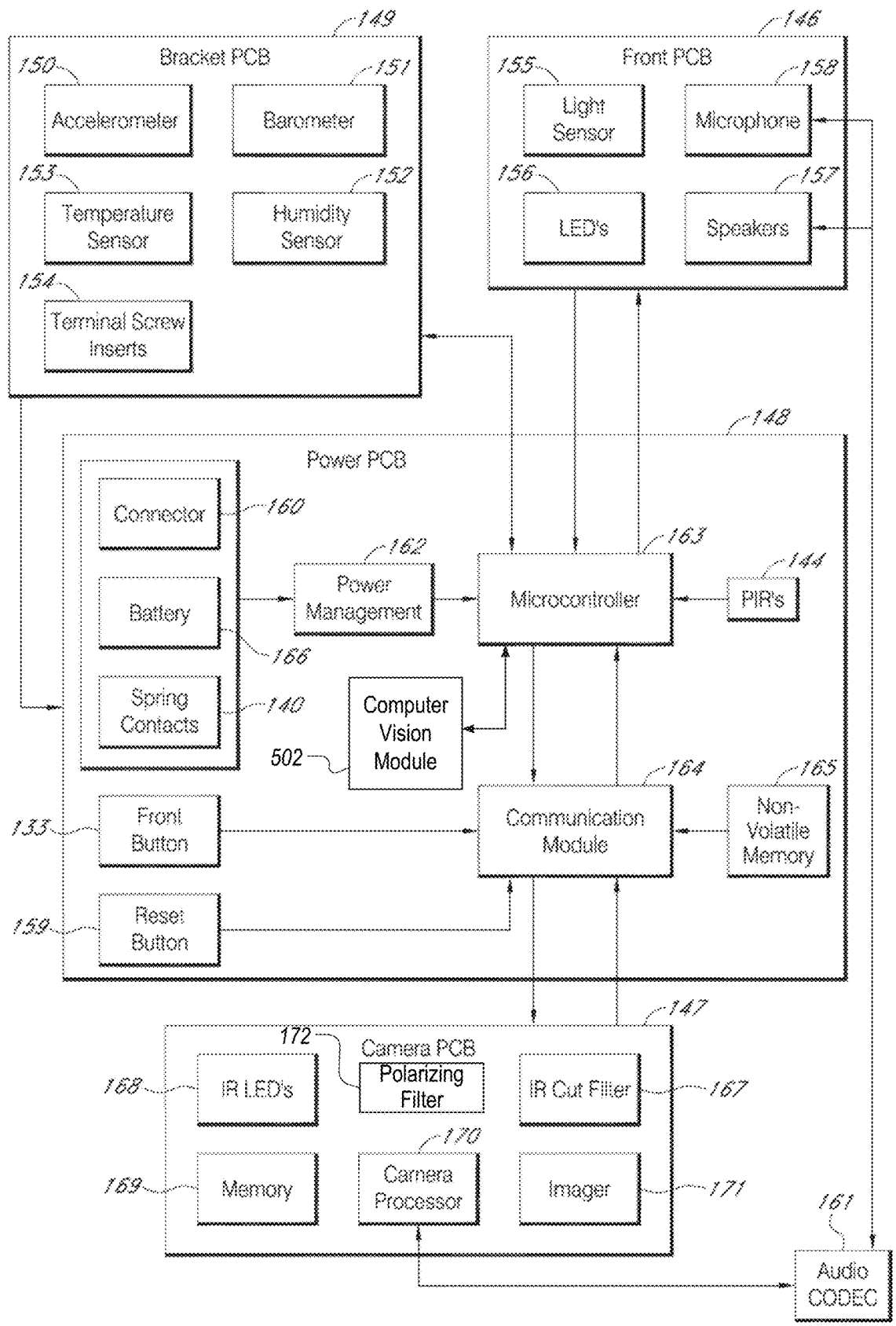
FIG. 5 is a functional block diagram of the components of the A/V doorbell of FIGS. 3 and 4.

FIGS. 3-5 illustrate an audio/video (A/V) recording and communication doorbell 130 (doorbell 130) according to an aspect of present embodiments. The doorbell 130 is an example of the A/V device 100 of FIG. 1. FIG. 3 is a front view, FIG. 4 is a rear view, and FIG. 5 is a functional block diagram of the components within or in communication with the doorbell 130. With reference to FIG. 3, the doorbell 130 includes a faceplate 135 mounted to a back plate 139 (FIG. 4). The faceplate 135 may comprise any suitable material, including, without limitation, metals, such as brushed aluminum or stainless steel, metal alloys, or plastics. The faceplate 135 protects the internal contents of the doorbell 130 and serves as an exterior front surface of the doorbell 130.

With reference to FIG. 3, the faceplate 135 includes a button 133 and a light pipe 136. The button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LEDs), contained within the doorbell 130, as further described below. The button 133 may make contact with a button actuator (not shown) located within the doorbell 130 when the button 133 is pressed by a visitor. When pressed, the button 133 may trigger one or more functions of the doorbell 130, as further described below.

With further reference to FIG. 3, the doorbell 130 further includes an enclosure 131 that engages the faceplate 135. In the illustrated embodiment, the enclosure 131 abuts an upper edge 135T of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described below. The camera 134 is an example of the camera 102 (FIG. 1).

FIG. 4 is a rear view of the doorbell 130, according to an aspect of the present embodiments. As illustrated, the enclosure 131 may extend from the front of the doorbell 130 around to the back thereof and may fit snugly around a lip of the back plate 139. The back plate 139 may comprise any suitable material, including, without limitation, metals, such as brushed aluminum or stainless steel, metal alloys, or plastics. The back plate 139 protects the internal contents of the doorbell 130 and serves as an exterior rear surface of the doorbell 130. The faceplate 135 may extend from the front of the doorbell 130 and at least partially wrap around the back plate 139, thereby allowing a coupled connection between the faceplate 135 and the back plate 139. The back plate 139 may have indentations in its structure to facilitate the coupling.

With further reference to FIG. 4, spring contacts 140 may provide power to the doorbell 130 when mated with other conductive contacts connected to a power source. The spring contacts 140 may comprise any suitable conductive material, including, without limitation, copper, and may be capable of deflecting when contacted by an inward force, for example the insertion of a mating element. The doorbell 130 further comprises a connector 160, such as a micro-USB or other connector, whereby power and/or data may be supplied to and from the components within the doorbell 130. A reset button 159 may be located on the back plate 139, and may contact a button actuator (not shown) located within the doorbell 130 when the reset button 159 is pressed. When the reset button 159 is pressed, it may trigger one or more functions, as described below.

FIG. 5 is a functional block diagram of the components within or in communication with the doorbell 130, according to an aspect of the present embodiments. A bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. The bracket PCB 149 may be located outside the housing of the doorbell 130 so as to reduce interference from heat, pressure, moisture, and/or other stimuli generated by the internal components of the doorbell 130.

With further reference to FIG. 5, the bracket PCB 149 may further comprise terminal screw inserts 154, which may receive terminal screws (not shown) for transmitting power to electrical contacts on a mounting bracket (not shown). The bracket PCB 149 may be electrically and/or mechanically coupled to the power PCB 148 through the terminal screws, the terminal screw inserts 154, the spring contacts 140, and the electrical contacts. The terminal screws may receive electrical wires located at the surface to which the doorbell 130 is mounted, such as the wall of a building, so that the doorbell can receive electrical power from the building's electrical system. Upon the terminal screws being secured within the terminal screw inserts 154, power may be transferred to the bracket PCB 149, and to all of the components associated therewith, including the electrical contacts. The electrical contacts may transfer electrical power to the power PCB 148 by mating with the spring contacts 140.

With further reference to FIG. 5, the front PCB 146 may comprise a light sensor 155, one or more light-emitting components, such as LEDs 156, one or more speakers 157, and a microphone 158. The light sensor 155 may be one or more sensors capable of detecting the level of ambient light of the surrounding environment in which the doorbell 130 may be located. LEDs 156 may be one or more light-emitting diodes capable of producing visible light when supplied with power. The speakers 157 may be any electro-mechanical device capable of producing sound in response to an electrical signal input. The microphone 158 may be an acoustic-to-electric transducer or sensor capable of converting sound waves into an electrical signal. When activated, the LEDs 156 may illuminate the light pipe 136 (FIG. 3). The front PCB 146 and all components thereof may be electrically coupled to the power PCB 148, thereby allowing data and/or power to be transferred to and from the power PCB 148 and the front PCB 146. The microphone 158 is an example of the microphone 104 (FIG. 1).

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by the one or more servers 118, and delivered to the user's client device 114. When the user speaks, after being transferred through the network 112, digital audio data is decompressed by audio CODEC 161 and emitted to the visitor via the speakers 157.

With further reference to FIG. 5, the power PCB 148 may comprise a power management module 162, a microcontroller 163 (may also be referred to as "processor," "CPU," or "controller"), the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160. The power management module 162 may also serve as a conduit for data between the connector 160 and the microcontroller 163.

With further reference to FIG. 5, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 5, the communication module 164 may comprise an integrated circuit including a processor core, memory, and programmable input/output peripherals. The communication module 164 may also transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 5, the camera PCB 147 may comprise components that facilitate the operation of the camera 134. For example, an imager (may also be referred to as "image sensor") 171 may comprise a video recording sensor and/or a camera chip. In one aspect of the present disclosure, the imager 171 may comprise a complementary metal-oxide semiconductor (CMOS) array, and may be capable of recording high definition (e.g., 720p, 1080p, etc.) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LEDs 168 may comprise light-emitting diodes capable of radiating infrared light.

The camera PCB 147 may further comprise an IR cut filter 167 and a polarizing filter 172. In various embodiments, one or both of the IR cut filter 167 and the polarizing filter 172 may comprise a mechanical shutter, a slider, or another electromechanically movable element that can be selectively positioned between the lens 238 and the image sensor 171 of the camera 134. In some embodiments, during daylight hours, or whenever there is a sufficient amount of ambient light, one or both of the IR cut filter 167 and the polarizing filter 172 may be positioned between the lens 238 and the image sensor 171 to filter out IR light (in the case of the IR cut filter 167) so that it does not distort the colors of images as the human eye sees them and/or to prevent glare (in the case of the polarizing filter 172). During nighttime hours, or whenever there is little to no ambient light, one or both of the IR cut filter 167 and the polarizing filter 172 may be withdrawn from the space between the lens 238 and the image sensor 171. In the case of the IR cut filter 167, removal of the filter at night makes the camera 134 sensitive to IR light, thereby providing the doorbell 130 with "night vision." When the light sensor 155 detects a low level of ambient light (which may comprise a level that impedes the performance of the imager 171 in the visible spectrum), the IR LEDs 168 may shine infrared light through the doorbell 130 enclosure out to the environment, and the IR cut filter 167 may enable the imager 171 to see this infrared light as it is reflected or refracted off of objects within the field of view of the doorbell 130. In some embodiments, the camera 134 may act as a light detector for use in controlling the current state of one or both of the IR cut filter 167 and the polarizing filter 172, and/or turning the IR LED(s) 242 on and off. Using the camera 134 as a light detector is facilitated in some embodiments by the fact that the A/V doorbell 130 is powered by a connection to AC mains, and the camera 134, therefore, may be always powered on. In other embodiments, however, the doorbell 130 may include a light sensor separate from the camera 134 for use in controlling one or more of the IR cut filter 167, the polarizing filter 172, and the IR LED 242.

As discussed above, the present disclosure provides numerous examples of methods and systems including A/V doorbells, but the present embodiments are equally applicable for A/V devices other than doorbells. For example, the present embodiments may include one or more A/V security cameras instead of, or in addition to, one or more A/V doorbells. An example A/V security camera may include substantially all of the structure and functionality of the doorbell 130, but without the front button 133 and its associated components. An example A/V security camera may further omit other components, such as, for example, the bracket PCB 149 and its associated components.

Figure 6:
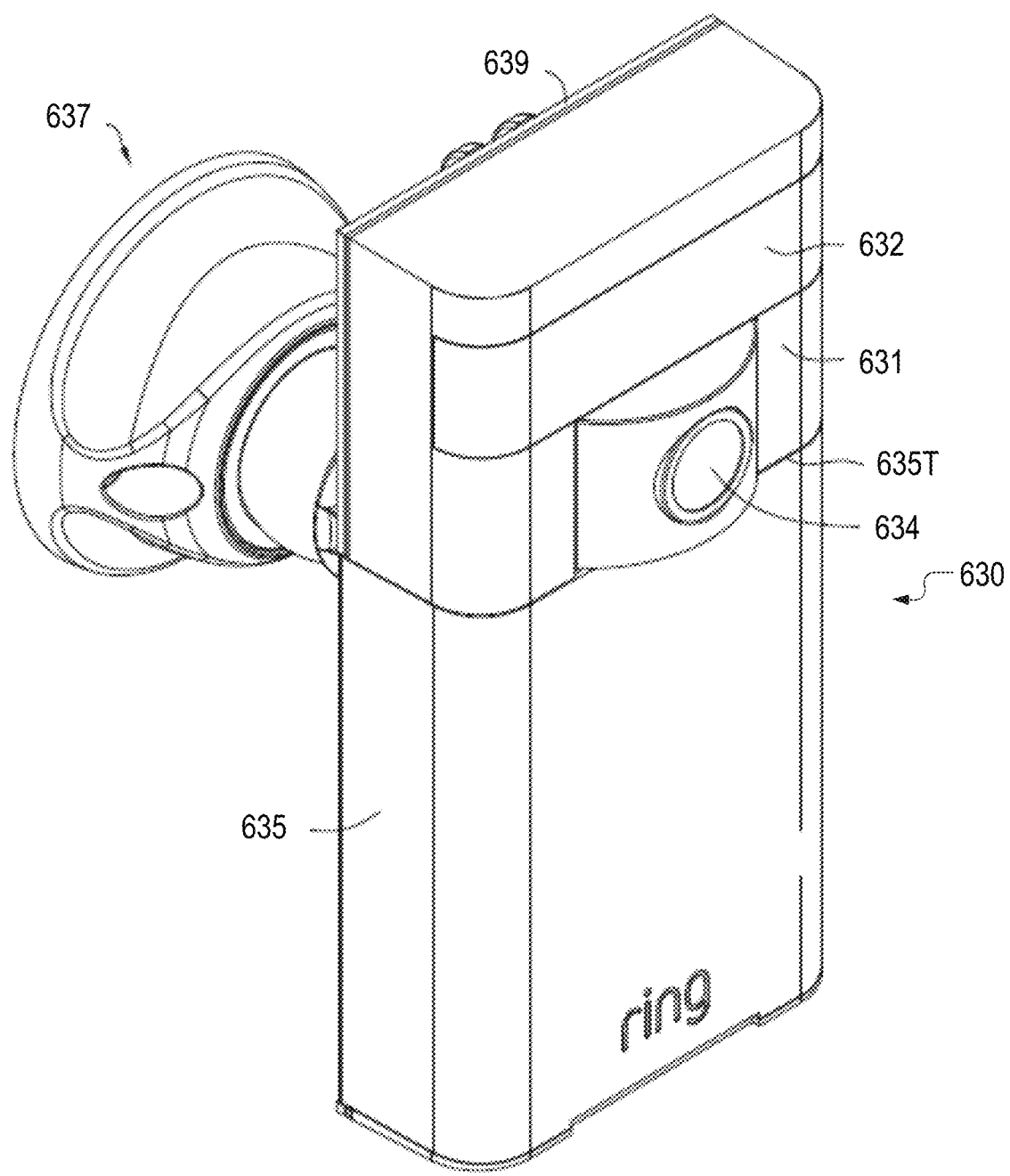
FIG. 6 is an upper front perspective view of an A/V security camera according to various aspects of the present disclosure.
Figure 7:
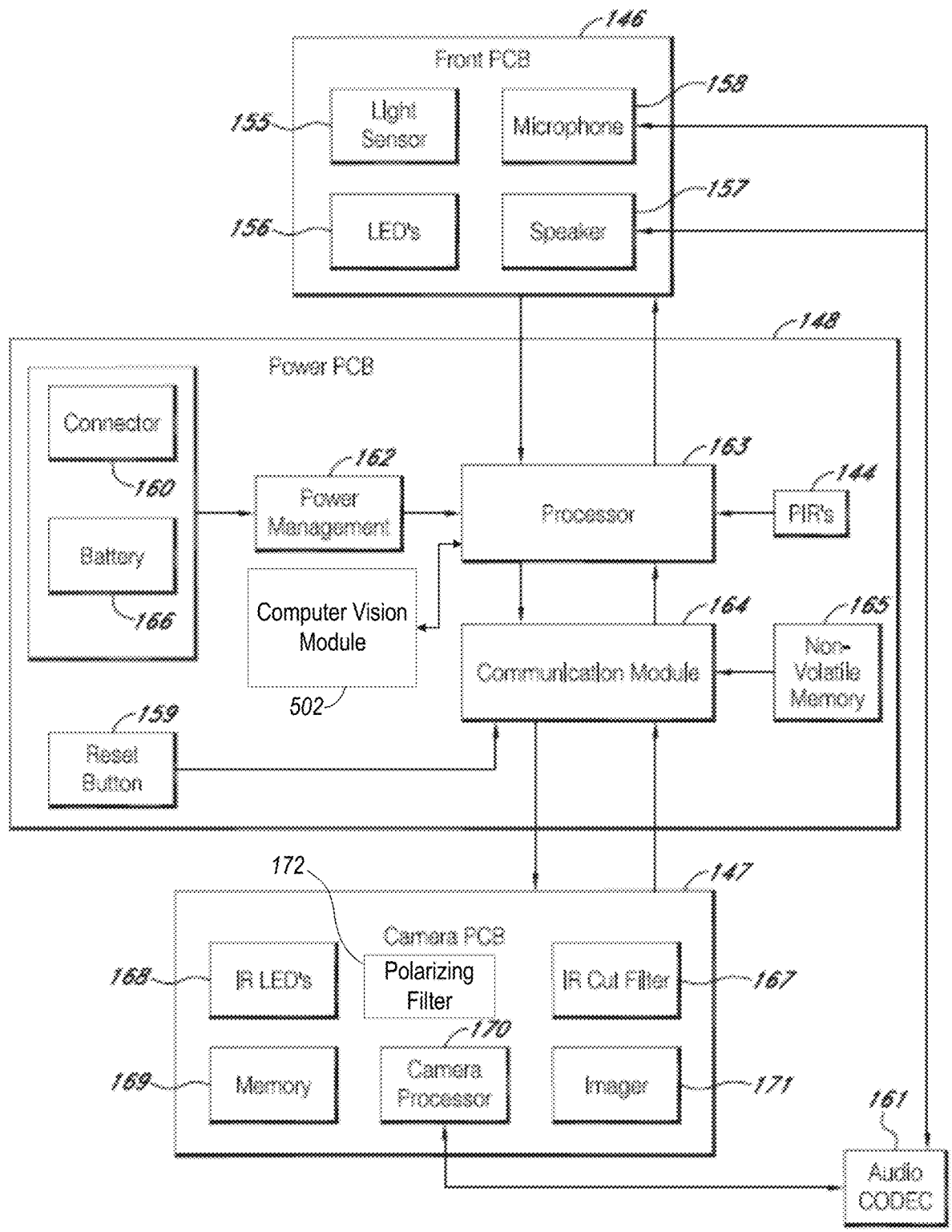
FIG. 7 is a functional block diagram of the components of the A/V security camera of FIG. 6.

FIGS. 6 and 7 illustrate an example A/V recording and communication security camera 630 according to various aspects of the present embodiments. The security camera 630 is another example of the A/V device 100 of FIG. 1. With reference to FIG. 6, the security camera 630, similar to the doorbell 130, includes a faceplate 635 that is mounted to a back plate 639 and an enclosure 631 that engages the faceplate 635. Collectively, the faceplate 635, the back plate 639, and the enclosure 631 form a housing that contains and protects the inner components of the security camera 630. However, unlike the doorbell 130, the security camera 630 does not include any front button 633 for activating the doorbell. The faceplate 635 may comprise any suitable material, including, without limitation, metals, such as brushed aluminum or stainless steel, metal alloys, or plastics. The faceplate 635 protects the internal contents of the security camera 630 and serves as an exterior front surface of the security camera 630.

With continued reference to FIG. 6, the enclosure 631 engages the faceplate 635 and abuts an upper edge 635T of the faceplate 635. As discussed above with reference to FIG. 3, in alternative embodiments, one or more gaps between the enclosure 631 and the faceplate 635 may facilitate the passage of sound and/or light through the security camera 630. The enclosure 631 may comprise any suitable material, but in some embodiments the material of the enclosure 631 preferably permits infrared light to pass through from inside the security camera 630 to the environment and vice versa. The security camera 630 further includes a lens 632. Again, similar to the doorbell 130, in some embodiments, the lens may comprise a Fresnel lens, which may be patterned to deflect incoming light into one or more infrared sensors located within the security camera 630. The security camera 630 further includes a camera 634, which captures video data when activated, as described above and below. The camera 634 is an example of the camera 102 (FIG. 1).

With further reference to FIG. 6, the enclosure 631 may extend from the front of the security camera 630 around to the back thereof and may fit snugly around a lip (not shown) of the back plate 639. The back plate 639 may comprise any suitable material, including, without limitation, metals, such as brushed aluminum or stainless steel, metal alloys, or plastics. The back plate 639 protects the internal contents of the security camera 630 and serves as an exterior rear surface of the security camera 630. The faceplate 635 may extend from the front of the security camera 630 and at least partially wrap around the back plate 639, thereby allowing a coupled connection between the faceplate 635 and the back plate 639. The back plate 639 may have indentations (not shown) in its structure to facilitate the coupling.

With continued reference to FIG. 6, the security camera 630 further comprises a mounting apparatus 637. The mounting apparatus 637 facilitates mounting the security camera 630 to a surface, such as an interior or exterior wall of a building, such as a home or office. The faceplate 635 may extend from the bottom of the security camera 630 up to just below the camera 634, and connect to the back plate 639 as described above. The lens 632 may extend and curl partially around the side of the security camera 630. The enclosure 631 may extend and curl around the side and top of the security camera 630, and may be coupled to the back plate 639 as described above. The camera 634 may protrude from the enclosure 631, thereby giving it a wider field of view. The mounting apparatus 637 may couple with the back plate 639, thereby creating an assembly including the security camera 630 and the mounting apparatus 637. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

FIG. 7 is a functional block diagram of the components of the A/V security camera 630 of FIG. 6. With reference to FIG. 7, the interior components of the security camera may be substantially identical to the interior components of the doorbell 130 described above and illustrated in FIGS. 3-5, except that the following components are omitted: the front button 133, the bracket PCB 149 and its components, and the spring contacts 140.

Figure 8:
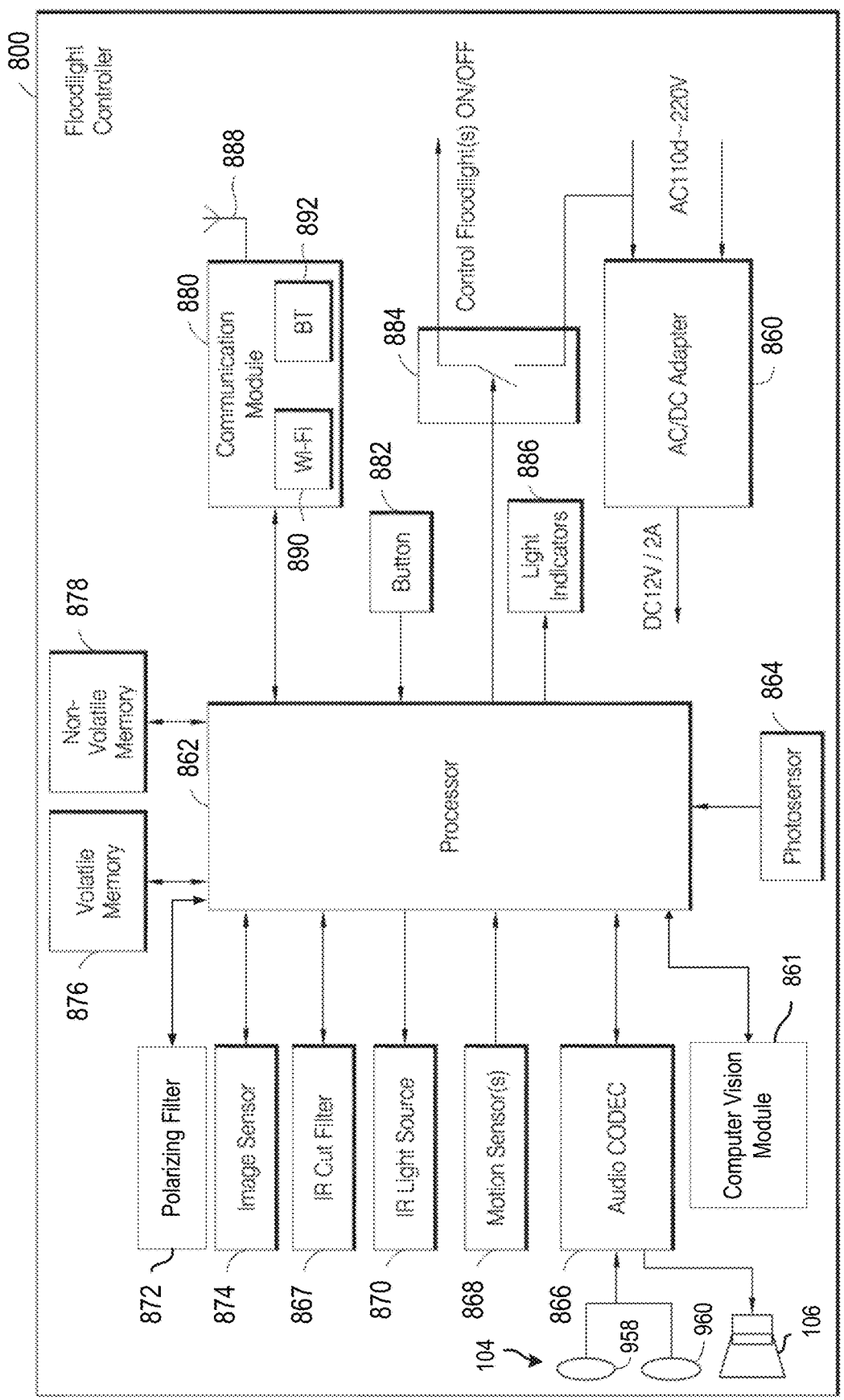
FIG. 8 is a functional block diagram of the components of a floodlight controller with A/V features according to various aspects of the present disclosure.
Figure 9:
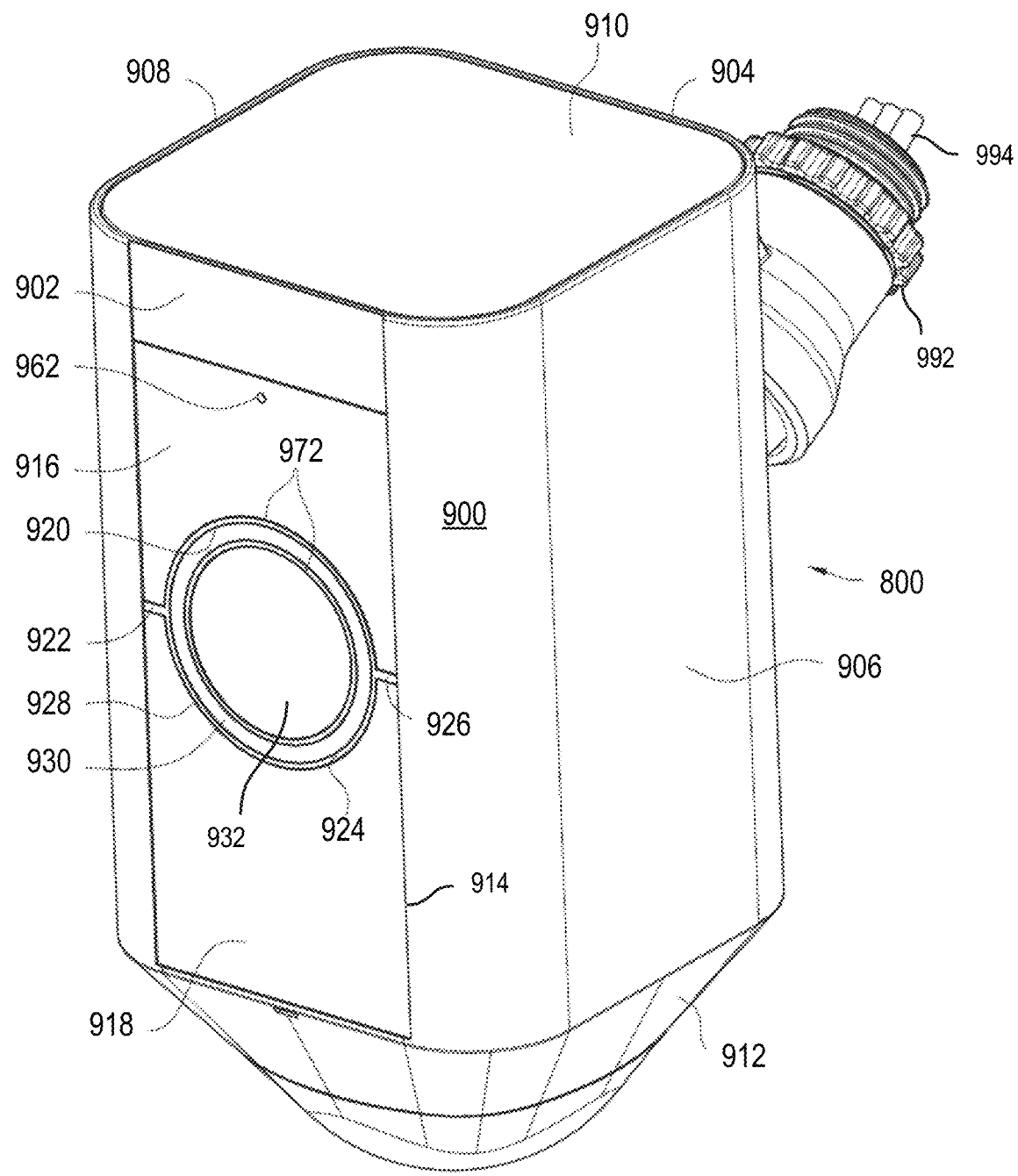
FIG. 9 is an upper front perspective view of a floodlight controller with A/V features according to various aspects of the present disclosure.
Figure 10:
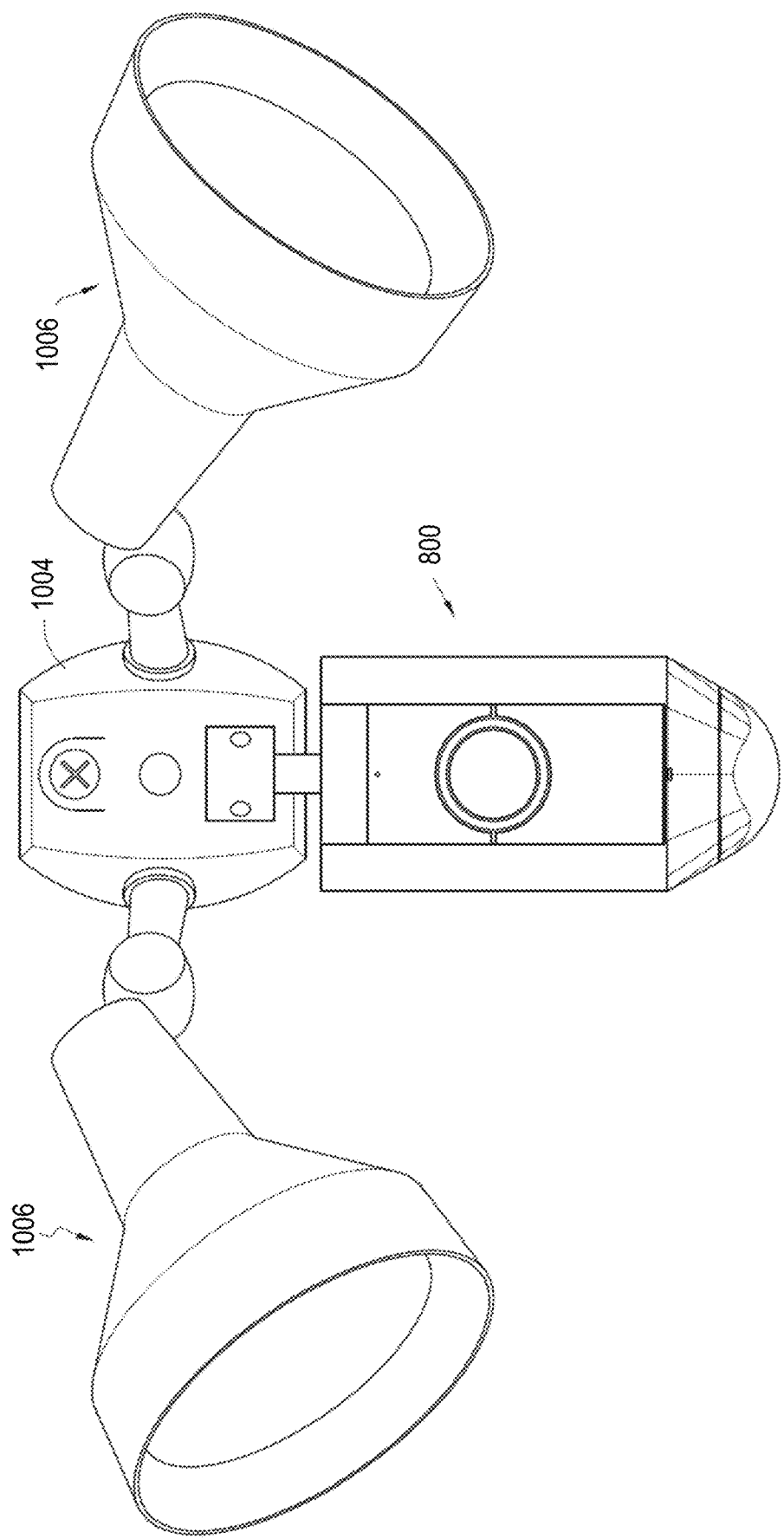
FIG. 10 is a front elevation view of the floodlight controller with A/V features of FIG. 9 in combination with a floodlight device according to various aspects of the present disclosure.

As discussed above, the present disclosure provides numerous examples of methods and systems including A/V doorbells, but the present embodiments are equally applicable for A/V devices other than doorbells. For example, the present embodiments may include one or more A/V floodlight controllers instead of, or in addition to, one or more A/V doorbells. FIGS. 8-10 illustrate an example A/V floodlight controller 800 according to various aspects of the present embodiments. The floodlight controller 800 may incorporate the functionality of the A/V device 100 of FIG. 1. Likewise, the A/V device 100 may incorporate the functionality of the floodlight controller 800. FIG. 8 is a functional block diagram illustrating various components of the floodlight controller 800 and their relationships to one another. For example, the floodlight controller 800 comprises an AC/DC adapter 860. The floodlight controller 800 is thus configured to be connected to a source of external AC (alternating-current) power, such as a household AC power supply (may also be referred to as AC mains). The AC power may have a voltage in the range of 110-220 VAC, for example. The incoming AC power may be received by the AC/DC adapter 860, which may convert the incoming AC power to DC (direct-current) and may step down the voltage from 110-220 VAC to a lower output voltage of about 12 VDC and an output current of about 2 A, for example. In various embodiments, the output of the AC/DC adapter 860 may be in a range of from about 9 V to about 15 V, for example, and in a range of from about 0.5 A to about 5 A, for example. These voltages and currents are only examples provided for illustration and are not limiting in any way.

With further reference to FIG. 8, the floodlight controller 800 further comprises other components, including a processor 862 (may also be referred to as a controller), a photosensor 864, an audio CODEC (coder-decoder) 866, the at least one speaker 106, the at least one microphone 104, at least one motion sensor 868, an infrared (IR) light source 870, an IR cut filter 867, an image sensor 874 (may be a component of the camera 102, and may be referred to interchangeably as the camera 102), a polarizing filter 872, volatile memory 876, non-volatile memory 878, a communication module 880, a button 882, a switch 884 for controlling one or more floodlights, and a plurality of light indicators 886. Each of these components is described in detail below.

With further reference to FIG. 8, the processor 862 may perform data processing and various other functions, as described below. The processor 862 may comprise an integrated circuit including a processor core, the volatile memory 876, the non-volatile memory 878, and/or programmable input/output peripherals (not shown). The volatile memory 876 may comprise, for example, DDR3 SDRAM (double data rate type three synchronous dynamic random-access memory). The non-volatile memory 878 may comprise, for example, NAND flash memory. In the embodiment illustrated in FIG. 8, the volatile memory 876 and the non-volatile memory 878 are illustrated outside the box representing the processor 862. The embodiment illustrated in FIG. 8 is, however, merely an example, and in some embodiments the volatile memory 876 and/or the non-volatile memory 878 may be physically incorporated with the processor 862, such as on the same chip. The volatile memory 876 and/or the non-volatile memory 878, regardless of their physical location, may be shared by one or more other components (in addition to the processor 862) of the present floodlight controller 800.

With further reference to FIG. 8, the image sensor 874 (camera 102), the IR light source 870, the IR cut filter 867, the polarizing filter 872, and the photosensor 864 are all operatively coupled to the processor 862. As described in detail below, the IR light source 870 and the IR cut filter 867 facilitate "night vision" functionality of the camera 102. For example, the photosensor 864 is configured to detect the level of ambient light about the floodlight controller 800. The processor 862 uses the input from the photosensor 864 to control the states of the IR light source 870 and the IR cut filter 867 to activate and deactivate night vision, as described below. In some embodiments, the image sensor 874 may comprise a video recording sensor or a camera chip. In some embodiments, the IR light source 870 may comprise one or more IR light-emitting diodes (LEDs).

With further reference to FIG. 8, the IR cut filter 867 and the polarizing filter 872 may be similar in structure and/or function to the IR cut filter 167 and the polarizing filter 172 described above with reference to FIGS. 5 and 5A. Thus, for example, in various embodiments one or both of the IR cut filter 867 and the polarizing filter 872 may comprise a mechanical shutter, a slider, or another electromechanically movable element that can be selectively positioned between the lens (not shown) and the image sensor 874. In some embodiments, during daylight hours, or whenever there is a sufficient amount of ambient light, one or both of the IR cut filter 867 and the polarizing filter 872 may be positioned between the lens and the image sensor 874 to filter out IR light (in the case of the IR cut filter 867) so that it does not distort the colors of images as the human eye sees them and/or to prevent glare (in the case of the polarizing filter 872). During nighttime hours, or whenever there is little to no ambient light, one or both of the IR cut filter 867 and the polarizing filter 872 may be withdrawn from the space between the lens and the image sensor 874. In the case of the IR cut filter 867, removal of the IR cut filter 867 at night makes the image sensor 874 sensitive to IR light, thereby providing the floodlight controller 800 with "night vision." When the photosensor 864 detects a low level of ambient light (which may comprise a level that impedes the performance of the image sensor 874 in the visible spectrum), the IR light source 870 may shine infrared light out to the environment, and the IR cut filter 867 may enable the image sensor 874 to see this infrared light as it is reflected or refracted off of objects within the field of view of the floodlight controller 800. In some embodiments, the photosensor 864 may be omitted and the image sensor 874 may act as a light detector for use in controlling the current state of one or both of the IR cut filter 867 and the polarizing filter 872, and/or turning the IR light source 870 on and off. Using the image sensor 874 as a light detector is facilitated in some embodiments by the fact that the floodlight controller 800 is powered by a connection to AC mains, and the image sensor 874, therefore, may be always powered on.

In the example shown, floodlight controller 800 includes a computer vision module 861, which in various embodiments performs computer vision processing with respect to images captured by the floodlight controller 800 via image sensor 874. Processor 862 is operatively coupled to computer vision module 861 and in various embodiments uses output received from computer vision module 861 to determine whether and/or when to selectively position one or both of IR cut filter 867 and polarizing filter 872 between the lens of floodlight controller 800 and image sensor 874.

In various embodiments, computer vision module 861 may be used, in connection with a premises security system to provide audio content simulating occupancy as disclosed herein, to determine one or more of to determine visitor identity, if known; determine one or more visitor attributes, e.g., to be used to select audio content to play back for the visitor to simulate occupancy; and to determine visitor reaction to played back audio content. For example, computer vision module 861 may be used to perform face detection, facial recognition, and/or three-dimensional (3D) facial recognition.

With further reference to FIG. 8, the at least one speaker 106 and the at least one microphone 104 are operatively coupled to the audio CODEC 866, which is operatively coupled to the processor 862. The transfer of digital audio between the user and a visitor (or intruder) may be compressed and decompressed using the audio CODEC 866, as described below. The motion sensor(s) 168 is also operatively coupled to the processor 862. The motion sensor(s) 868 may comprise, for example, passive infrared (PIR) sensors, or any other type of sensor capable of detecting and communicating to the processor 862 the presence and/or motion of an object within its field of view. When the processor 862 is triggered by the motion sensor(s) 868, the processor 862 may perform one or more functions, as described below.

With further reference to FIG. 8, the communication module 880 is operatively coupled to the processor 862. The communication module 880, which includes at least one antenna 888, is configured to handle communication links between the floodlight controller 800 and other, external devices or receivers, and to route incoming/outgoing data appropriately. For example, inbound data from the antenna(s) 888 may be routed through the communication module 880 before being directed to the processor 862, and outbound data from the processor 862 may be routed through the communication module 880 before being directed to the antenna(s) 888. The communication module 880 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, Bluetooth, or any other protocol and/or technology. In the illustrated embodiment, the communication module 180 includes a Wi-Fi chip 890 and a Bluetooth chip 892, but these components are merely examples and are not limiting. Further, while the Wi-Fi chip 890 and the Bluetooth chip 892 are illustrated within the box representing the communication module 880, the embodiment illustrated in FIG. 8 is merely an example, and in some embodiments the Wi-Fi chip 890 and/or the Bluetooth chip 892 are not necessarily physically incorporated with the communication module 880.

In some embodiments, the communication module 880 may further comprise a wireless repeater (not shown, may also be referred to as a wireless range extender). The wireless repeater is configured to receive a wireless signal from a wireless router (or another network device) in the user's network 110 and rebroadcast the signal. Wireless devices that are not within the broadcast range of the wireless router, or that only weakly receive the wireless signal from the wireless router, may receive the rebroadcast signal from the wireless repeater of the communication module 880, and may thus connect to the user's network 110 through the floodlight controller 800. In some embodiments, the wireless repeater may include one or more transceiver modules (not shown) capable of transmitting and receiving data, and using, for example, one or more protocols and/or technologies, such as Wi-Fi (IEEE 802.11), WiMAX (IEEE 802.16), or any other protocol and/or technology.

With further reference to FIG. 8, when a visitor (or intruder) who is present in the area about the floodlight controller 800 speaks, audio from the visitor (or intruder) is received by the microphone(s) 104 and compressed by the audio CODEC 866. Digital audio data is then sent through the communication module 880 to the network 112 (FIG. 1) via the user's network 110, routed by the server 118 and/or the API 120, and delivered to the user's client device 114. When the user speaks, after being transferred through the network 112, the user's network 110, and the communication module 880, the digital audio data from the user is decompressed by the audio CODEC 866 and emitted to the visitor through the speaker 106, which may be driven by a speaker 106 driver (not shown).

With further reference to FIG. 8, the button 882 is operatively coupled to the processor 862. The button 882 may have one or more functions, such as changing an operating mode of the floodlight controller 800 and/or triggering a reset of the floodlight controller 800. For example, when the button 882 is pressed and released, it may cause the communication module 880 of the floodlight controller 800 to enter access point (AP) mode, which may facilitate connecting the floodlight controller 800 to the user's network 110. Alternatively, or in addition, when the button 882 is pressed and held down for at least a threshold amount of time, it may trigger the erasing of any data stored at the volatile memory 876 and/or at the non-volatile memory 878, and/or may trigger a reboot of the processor 862.

With reference to FIG. 9, the floodlight controller 800 comprises a housing 900 for containing and protecting the interior components of the floodlight controller 800. The housing 900 includes a front wall 902, a rear wall 904, opposing side walls 906, 908, an upper wall 910, and a tapered lower portion 912. The front wall 902 includes a central opening 914 that receives an upper shield 916 and a lower grill 918. In the illustrated embodiment, front surfaces of the upper shield 916 and the lower grill 918 are substantially flush with a front surface of the front wall 902, but in alternative embodiments these surfaces may not be flush with one another. The upper shield 916 is substantially rectangular, and includes a semicircular indentation 920 along its lower edge 922. The lower grill 918 is substantially rectangular, and includes a semicircular indentation 924 along its upper edge 926. Together, the semicircular indentations 920, 924 in the upper shield 916 and the lower grill 918 form a circular opening 928 that accommodates a light pipe 930. A cover 932 extends across and closes an outer open end of the light pipe 930. The upper shield 916, the lower grill 918, the light pipe 930, and the cover 932 are all described in further detail below. The camera (not shown) is located in the circular opening 928 formed by the upper shield 916 and the lower grill 918, behind the cover 932, and is surrounded by the light pipe 930.

With reference to FIG. 8, the floodlight controller 800 further comprises the microphones 104. In the illustrated embodiment, a first microphone 958 of the microphones 104 is located along the front of the floodlight controller 800 behind the upper shield 916 (FIG. 9) and a second microphone 960 of the microphones 104 is located along the left side of the floodlight controller 800 behind the left-side wall 908 (FIG. 9) of the housing 900. Including two microphones 258, 260 that are spaced from one another and located on different sides of the floodlight controller 800 provides the illustrated embodiment of the floodlight controller 800 with advantageous noise cancelling and/or echo cancelling for clearer audio. The illustrated embodiment is, however, just one example and is not limiting. Alternative embodiments may only include one microphone 104, or include two microphones 104 in different locations than as described above.

With reference to FIG. 9, the upper shield 916 may include a first microphone opening 962 located in front of the first microphone 958 to facilitate the passage of sound through the upper shield 916 so that sounds from the area about the floodlight controller 800 can reach the first microphone 958. The left-side wall 908 of the housing 900 may include a second microphone opening (not shown) located in front of the second microphone 960 that facilitates the passage of sound through the left-side wall 908 of the housing 900 so that sounds from the area about the floodlight controller 800 can reach the second microphone 960.

With further reference to FIG. 9, the floodlight controller 800 may further comprise a light barrier 972 surrounding inner and outer surfaces of the light pipe 930. The light barrier 972 may comprise a substantially opaque material that prevents the light generated by the light indicators 886 from bleeding into the interior spaces of the floodlight controller 800 around the light pipe 930. The light barrier 972 may comprise a resilient material, such as a plastic, which may also advantageously provide moisture sealing at the junctures between the light pipe 930 and the upper shield 916 and the lower grill 918. Portions of the light barrier 972 may also extend between the junctures between the upper shield 916 and the lower grill 918.

With further reference to FIG. 9, the floodlight controller 800 further comprises connecting hardware 992 for connecting the floodlight controller 800 to a floodlight device 1004 (FIG. 10) and a power source (not shown). The floodlight controller 800 further comprises a plurality of wires 994 for connecting the floodlight controller 800 to the power supply and to the floodlight(s) 1006 (FIG. 10) of the floodlight device 1004 (for enabling the floodlight controller 800 to turn the floodlight(s) 1006 on and off). In the illustrated embodiment, three wires 994 are shown, but the illustrated embodiment is merely one example and is not limiting. In alternative embodiments, any number of wires 994 may be provided.

Figure 11:
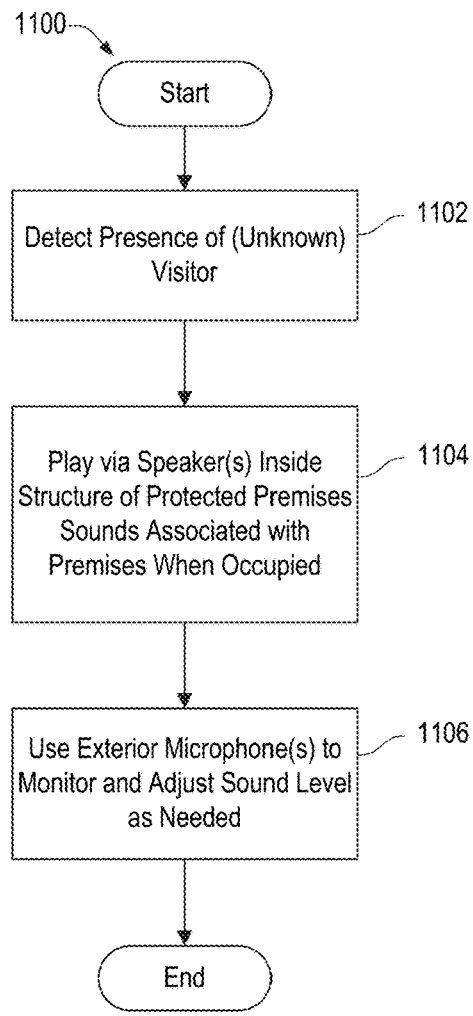
FIG. 11 is a flowchart illustrating a process for providing audio content simulating occupancy according to an aspect of the present disclosure.

In various embodiments, A/V recording and communication devices as described herein are used in the context of a premises security system to provide audio content simulating occupancy. For example, FIG. 11 is a flowchart illustrating a process for providing audio content simulating occupancy according to an aspect of the present disclosure. In various embodiments, the process 1100 of FIG. 11 may be implemented by a premises security system, such as a system including the hub device 2415 described below with reference to FIG. 24. For example, in various embodiments, the process of FIG. 11 may be implemented by software code running on a processor comprising a premises security system as disclosed herein. In some embodiments, a premises security system as disclosed herein may perform the process 1100 only with respect to visitors that arrive at a time when the premises security system is in an "armed" or "away" mode. In some embodiments, the premises security system may place itself in the armed or away mode automatically, e.g., upon detecting that the premises protected by the system is not currently occupied.

In the example shown in FIG. 11, at block 1102 presence of a visitor is detected. In various embodiments, presence of the visitor may be detected at least in part by one or more sensors or other components comprising an A/V device as described herein. For example, presence of the visitor may be detected by one or more of a motion sensor, a camera, a microphone, and/or one or more other active or passive sensors and/or input devices of an A/V device.

In some embodiments, block 1102 may include determining that the visitor is an unknown or unwanted visitor. The determination that the visitor is unknown or unwanted may be made at least in part using face recognition and/or computer vision (or similar) technologies, as described more fully below. In some embodiments, if a person approaching is determined to be a known person, such as an occupant or other authorized person (e.g., a housecleaner arriving at a regularly scheduled day/time), the process 1100 of FIG. 11 may not performed with respect to that visitor.

In response to detecting presence of the (unknown) visitor, at block 1104 sounds associated with the premises in an occupied state are played back via one or more speakers inside the premises (e.g., inside a home or other structure). In some embodiments, sounds are played back via a speaker included in, connected to, or otherwise associated with a security hub component that is connected via network connections to one or more other components of a premises security system, such as one or more A/V devices. In some embodiments, the audio content that is played back may have been recorded previously, e.g., at the same premises during a time when the premises was occupied, or at one or more other premises at times when such premises were occupied.

Referring further to FIG. 11, at block 1106 one or more exterior microphones are used to monitor and adjust (as/if needed) a sound level of audio content associated with occupancy. For example, a microphone included in an A/V device located near the visitor may be used to ensure the audio is being played back at a level that is audible to the visitor. For example, audio played back at one level may be audible to a visitor at night, when background noise may be low, but depending on the location, time of day, day of the week, etc., background noise may require playback at a different, higher level to be audible to a visitor. In some embodiments, in addition to and/or instead of using a microphone to determine sufficiency of the audio level, computer vision techniques may be used to assess programmatically, e.g., based on detected visitor reaction (or not), whether the audio playback level is sufficient.

In various embodiments, the premises security system discontinues playing audio content simulating occupancy based on a stop criterion being met. For example, in some embodiments, the premises security system uses video content or other input from an A/V device to determine the visitor is no longer present. In some embodiments, playback may be discontinued, or paused, if a user associated with the premises answers a call initiated by the visitor via an A/V device at the premises, such as a doorbell comprising an A/V device. For example, the visitor may press a button on the A/V doorbell, and the user may answer the call, and at that time the playback may be discontinued or paused.

Figure 12:
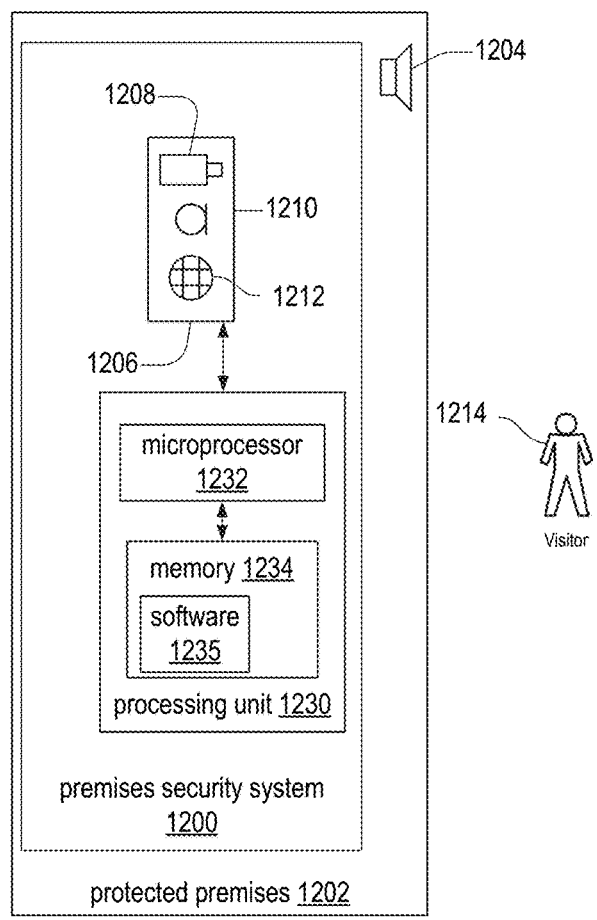
FIG. 12 is a block diagram illustrating a premises security system configured to provide audio simulating occupancy according to an aspect of the present disclosure.

FIG. 12 is a block diagram illustrating a premises security system 1200 configured to provide audio simulating occupancy according to an aspect of the present disclosure. In the example shown, a protected premises 1202 has an internal speaker 1204 that is used as disclosed herein to provide (playback) audio content simulating occupancy. In some embodiments, the speaker 1204 may be an integrated or peripheral component of a security hub or other network device, or may be otherwise connected to the multi-component premises security system. Also in some embodiments, the speaker 1204 may be an integrated or peripheral component of a virtual assistant (VA) device, such as an Amazon Echo device (sometimes referred to as "Alexa"). In the example shown, the premises security system 1200 includes (and/or has access via a network or other connection to) an A/V device 1206. The A/V device 1206 includes at least a camera 1208, a microphone 1210, and a speaker 1212. The premises security system 1200 may include the speaker 1204. The camera 1208 and the microphone 1210 are examples of the camera 102 and the microphone 104 (FIG. 1), respectively.

The premises security system 1200 may include a processing unit 1230, which may be communicatively coupled to the A/V device 1206 and to the speaker 1204. In certain embodiments, the processing unit 1230 may be located within the protected premises 1202, such as within a security hub component (e.g., the security hub component 1302 of FIG. 13). The processing unit 1230 may include at least one of a processor 1232 and a memory 1234 communicatively coupled thereto. The memory 1234 may store software 1235 that includes machine-readable instructions that are executed by the processor 1232 to implement functionality of the premises security system 1200. The processor 1232 may be an example of the processor 163 and/or the camera processor 170, FIG. 7. The memory 1234 may be an example of the memory 165 and/or the camera PCB memory 169, FIG. 7.

The memory 1234 may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of the memory 1234 may be integrated into the processor 1232.

In various embodiments, upon approach of a visitor 1214, the premises security system 1200 may perform the process 1100 of FIG. 11, e.g., by playing through speaker 1204 audio content simulating occupancy of the premises 1202. Presence of the visitor 1214 may be detected at least in part based on video content captured by the camera 1208 and/or based on detection of motion by a motion sensor of the A/V device 1206. Audio level of the playback may be monitored using the microphone 1210 and/or by using computer vision techniques to process video captured by the camera 1208 to assess a reaction of the visitor 1214 to the audio being played back via the speaker 1204.

In some embodiments, the audio played back via the speaker 1204 may be audio that was captured previously, e.g., using one or more microphones (not shown in FIG. 12) internal to the protected premises 1202 (e.g., inside a home or other structure). In some embodiments, the audio content played back via the speaker 1204 may have been captured previously using an exterior microphone, e.g., the microphone 1210 and/or a microphone comprising one or more other A/V devices (not shown in FIG. 12). In some embodiments, backend audio processing may be performed on audio captured by exterior microphones, to provide audio content suitable for playback inside the premises, via the speaker 1204.

Figure 13:
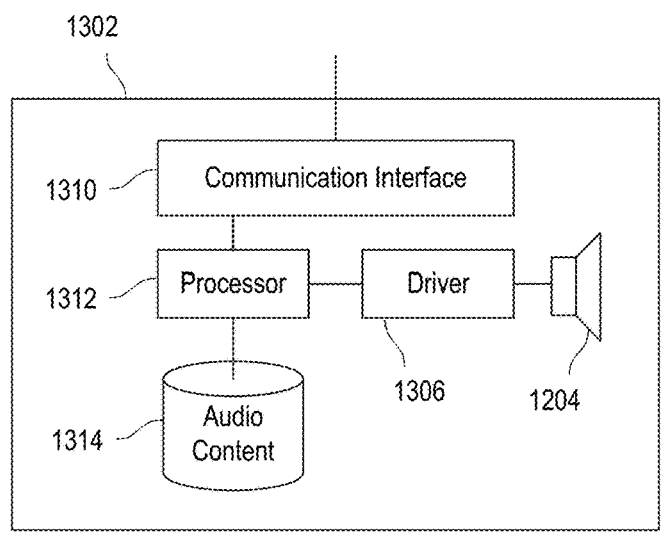
FIG. 13 is a block diagram illustrating a hub component of a premises security system configured to provide audio simulating occupancy according to an aspect of the present disclosure.

FIG. 13 is a block diagram illustrating a security hub component 1302 of the premises security system 1200 (FIG. 12), which is configured to provide audio simulating occupancy according to an aspect of the present disclosure. The security hub component 1302 may be an example of the processing unit 1230. In the example shown, the speaker 1204 of FIG. 12 is integrated with the security hub component 1302 (e.g., the hub device 2415 of FIG. 24). The security hub component 1302 includes a driver 1306 to drive the speaker 1204 to play audio content simulating occupancy, under control of a processor 1312. In some embodiments, the processor 1312 may perform all or part of the process 1100 of FIG. 11. The processor 1312 is configured to send/receive network communications via a communication interface 1310, e.g., a network interface card, a Wi-Fi antenna and interface, etc. While a wired connection to the communication interface 1310 is shown in FIG. 13, in various embodiments the connection may be wireless. The processor 1312 is connected to an audio content data store 1314 in which tracks of audio content associated with occupancy may be stored. The audio content data store 1314 may comprise one or more files or other objects stored in a storage device comprising the hub 1302, including one or more of memory and persistent storage, such as a solid-state storage device (SSD) or other storage drive or device. In various embodiments, audio content of the protected premises when occupied may be captured via a microphone (not shown in FIG. 13) and received by the processor 1312, via a communication interface 1310, and stored in the audio content data store 1314. In various embodiments, the processor 1312 may receive, via the communication interface 1310, data comprising or representative of sound levels as detected via an exterior microphone (e.g., the microphone 1210 of FIG. 12). For example, the exterior microphone may be used to detect sound levels associated with the approach of a visitor to the protected premises 1202. The processor 1312 in various embodiments is configured to use such sound level feedback to adjust a level at which audio content is played back via the speaker 1204. For example, higher than usual ambient noise detected by the microphone 1210 may result in an increase in the audio level at which the audio content simulating occupancy is played back via the speaker 1204, so that the audio content simulating occupancy is audible to the approaching visitor.

Figure 14:
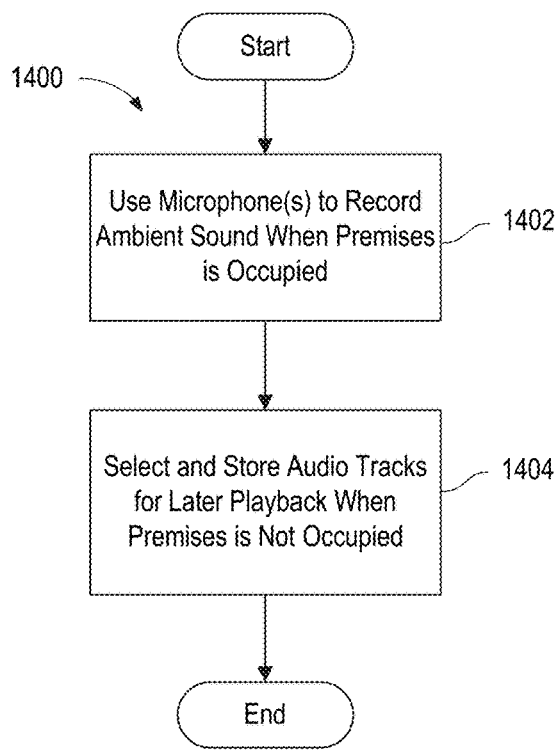
FIGS. 14 and 15 are flowcharts illustrating processes for providing audio content simulating occupancy according to aspects of the present disclosure.

In various embodiments, audio content captured while a premises is occupied may be stored for later playback to simulate occupancy (of that and/or one or more other premises). For example, FIG. 14 is a flowchart illustrating a process 1400 for providing audio content simulating occupancy according to an aspect of the present disclosure. In various embodiments, the process 1400 of FIG. 14 may be implemented by a processor comprising a premises security system, such as the processor 1312 of FIG. 13. In the example shown, at block 1402 one or more microphones are used to record ambient sound when the premises is occupied. For example, microphones in each of one or more rooms may be used to record ambient sounds. A microphone at or near a location of a speaker to be used to play back the audio at a later time, to simulate occupancy, may be used to capture the audio. In some embodiments, captured audio may be stored in an audio content data store, such as the audio content data store 1314 of FIG. 13.

At block 1404, tracks of audio content are selected and stored for later playback. For example, raw audio content may be searched algorithmically to identify segments of interest. For example, segments comprising mostly background (e.g., "white") noise may be identified and stored as white noise tracks. Other segments containing other types of content, e.g., sounds of cooking, two or more people in conversation, a person singing, a dog barking, kids playing, etc., may be identified and stored.

In some embodiments, audio content may be selected to be stored for later playback based at least in part on an attribute of the premises. For example, geographic location of the premises may be used to select audio content that reflects a regional accent, local language usage, etc. associated with a location in which the premises is located.

In some embodiments, metadata associated with the audio content data also may be stored. Examples of such metadata include, without limitation, data identifying a microphone, room, and/or location with which the audio content is associated, and metadata indicating a time of day, day of the week, season of the year, etc. with which the captured audio content is associated. Other metadata characterizing the audio content, e.g., dinner party, barking dog, conversation, kids playing, etc., may be determined (e.g., by automated processing of audio content data, manual data entry, etc.) and stored.

In various embodiments, audio content may be played back via different speakers at the protected premises. For example, to make it seem to a visitor listening outside that one or more people (or pets) are present and moving around inside the premises, sounds may be played from different selected speakers at different times. In some embodiments, stereophonic or other audio mixing techniques may be used to simulate movement of a source of audio content between different locations at the premises.

Figure 15:
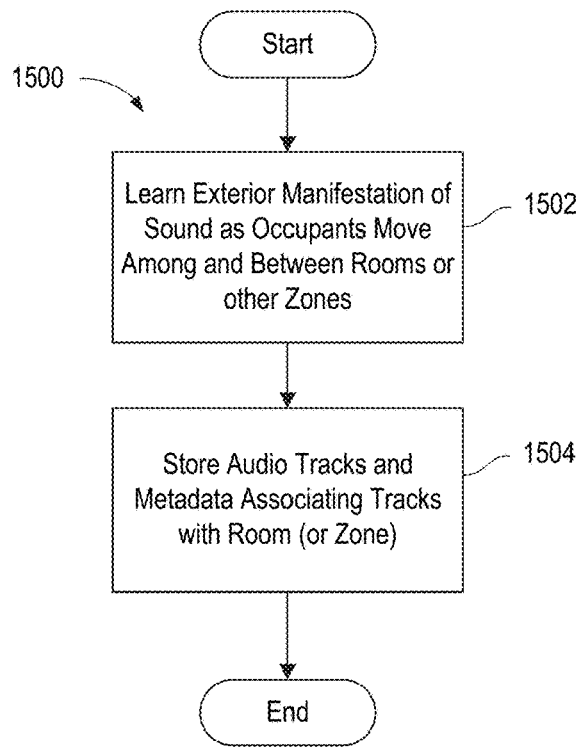

FIG. 15 is a flowchart illustrating a process 1500 for providing audio content simulating occupancy according to an aspect of the present disclosure. In various embodiments, the process 1500 of FIG. 15 may be implemented by a processor comprising a premises security system, such as the processor 1312 of FIG. 13. In the example shown, at block 1502 the exterior manifestation of sound as occupants move among and between rooms or other zones are learned. For example, while audio content is being recorded inside the premises, for later use to simulate occupancy, outside microphones may be monitored to learn for each outside microphone which actual occupant sounds recorded in which rooms are audible, and for each at what level. Such knowledge is used later, in some embodiments, to select audio content for playback, e.g., based on a visitor's location on the exterior perimeter of the premises. At block 1504, audio tracks are stored and associated with metadata indicating for each track a room, zone, or other location identifying information (e.g., microphone ID) with which the track is associated and/or which exterior location(s) the track has been determined to have been audible from.

Figure 16:
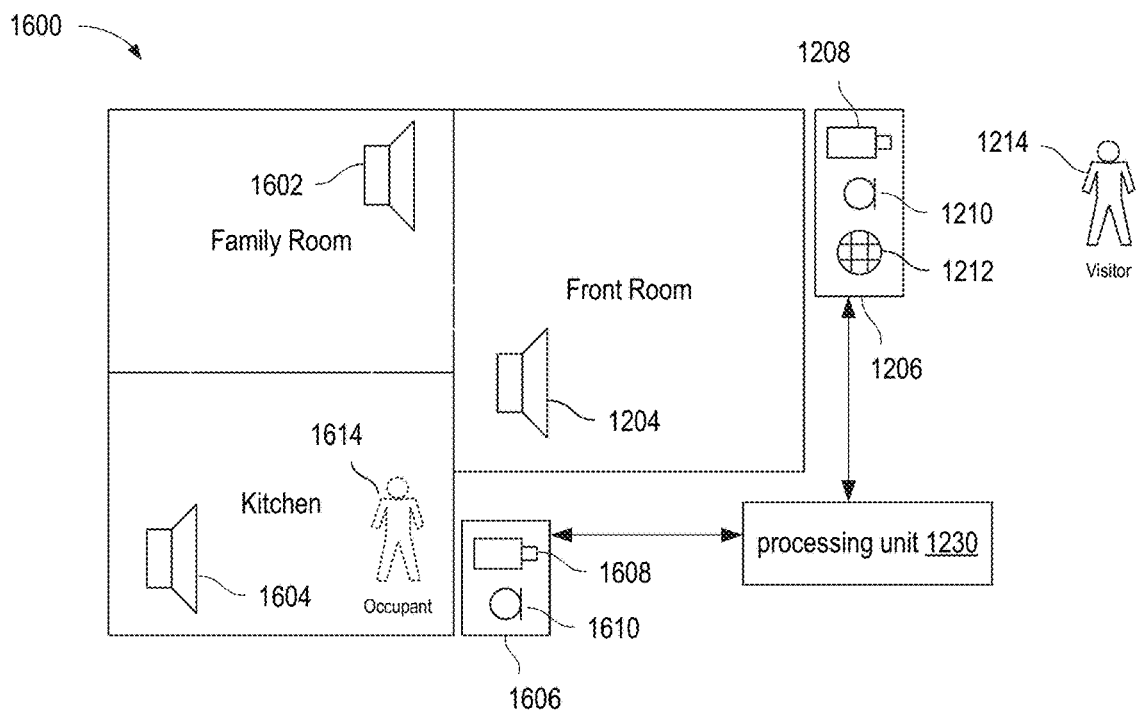
FIG. 16 is a block diagram illustrating a premises security system configured to provide audio simulating occupancy according to an aspect of the present disclosure.

FIG. 16 is a block diagram illustrating a premises security system 1600 configured to provide audio simulating occupancy according to an aspect of the present disclosure. The premises security system 1600 includes at least one of the A/V device 1206 and an A/V device 1606. As such, the premises security system 1600 may also include the processing unit 1230, which is communicatively coupled to at least one of the A/V devices 1206 and 1606.

In the example shown, the premises security system 1600 protects a multi-room home that includes a "front room," a "family room," and a "kitchen." While three rooms in a given configuration are shown in FIG. 16, any number or type of rooms or other zones may be protected. In this example, the speaker 1204 of FIGS. 12 and 13 is shown in the front room, and additional speakers 1602 and 1604 are located in the family room and the kitchen, respectively. Like the speaker 1204, either or both of the additional speakers 1602, 1604 may be an integrated or peripheral component of a virtual assistant (VA) device, such as an Amazon Echo device (sometimes referred to as "Alexa").

The A/V device 1206 of FIG. 12 is shown mounted at a location adjacent to the front room, e.g., near a front entrance. The A/V device 1606, which may include at least one of a video camera 1608 and a microphone 1610, is shown mounted in a second location nearer the kitchen. The video camera 1608 and the microphone 1610 are examples of the camera 102 and the microphone 104 (FIG. 1), respectively.

In various embodiments, the premises security system 1600 may use one or more of the speakers 1204, 1602, and 1604 to play back audio content simulating occupancy, including by alternately (and/or stereophonically) using the speakers 1204, 1602, and 1604 to make it seem to visitors, such as the visitor 1214, that someone (e.g., an occupant 1614 simulated by the audio content) is moving between locations within the premises (e.g., a home or other structure). For example, in some embodiments, the premises security system 1600 may be configured (e.g., by software executed by the processor 1232 of the processing unit 1630) to periodically move playback among the speakers 1204, 1602, and 1604 to simulate movement between the rooms by the simulated occupant 1614.

In some embodiments, the premises security system 1600 may move the sounds simulating the occupant 1614 between the rooms based at least in part on information indicating movement of the visitor 1214 between locations around the premises. For example, based on window locations, etc., the premises security system 1600 may play back audio content via the speakers 1602 and 1604 when the visitor 1214 is at a location near the A/V device 1206, and instead may alternate between the speakers 1602 and 1204 if the visitor 1214 is instead nearer to the A/V device 1606. Movement of sound sources within the premises may be more realistic. Movement to locations not visible from a location at which the visitor 1214 is located may prevent the visitor from detecting the premises is not in fact occupied. The cameras 1208, 1608 and/or microphones 1210, 1610 of the respective A/V devices 1206, 1606 may be used in various embodiments to track movements by the visitor 1214. In various embodiments, an administrative interface, such as a web-based interface, may be provided to enable a user to configure the premises security system 1600 to use certain speaker(s) specified by the user to play back audio content simulating occupancy depending on the location of the visitor 1214.

FIG. 17 is a flowchart illustrating a process 1700 for providing audio content simulating occupancy according to an aspect of the present disclosure. In various embodiments, the process 1700 of FIG. 17 may be implemented by a premises security system, such as the premises security system 1600 of FIG. 16. In the example shown, at block 1702 presence of a visitor is detected. In some embodiments, the processing unit 1230 may implement computer vision or other techniques to determine that the visitor is an unknown visitor. At block 1704, audio content simulating occupancy is provided in a manner that simulates (virtual) occupant movement within the protected premises, e.g., as described above in connection with the example shown in FIG. 16.

FIG. 18 is a flowchart illustrating a process 1800 for providing audio content simulating occupancy according to an aspect of the present disclosure. In various embodiments, the process 1800 of FIG. 18 may be implemented by a premises security system, such as the premises security system 1600 of FIG. 16. In the example shown, at block 1802 visitor movement around the exterior of the premises is tracked. For instance, in the example shown in FIG. 16, the cameras 1208, 1608 and/or the microphones 1210, 1610 of the A/V devices 1206, 1606, respectively, may be used to track visitor movement. Video, audio, or other sensor data captured by the A/V devices 1206, 1606 may be sent via network connections to a central hub (e.g., the hub device 115) located at the premises. A processor included in the hub may be configured (e.g., by software code or other logic) to interpret such inputs to determine visitor movement at and/or between locations associated with A/V devices installed at the premises, such as the A/V devices 1206 and 1606 in the example shown in FIG. 16. At block 1804, playback of the audio content simulating occupancy is adjusted in response to the tracked visitor movement in order to maintain the appearance of occupant movement within the protected premises, e.g., as described above in connection with the example shown in FIG. 16.

Some of the present embodiments may comprise computer vision for one or more aspects, such as detecting a region of interest (e.g., recognizing a human face or another region of interest); determining one or visitor attributes; tracking visitor movements; and/or assessing visitor response to playback of audio content simulating occupancy. Computer vision includes methods for acquiring, processing, analyzing, and understanding images and, in general, high-dimensional data from the real world in order to produce numerical or symbolic information, e.g. in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g. ASCII). 2D Code Reading—Reading of 2D codes such as data matrix and QR codes. Facial Recognition. Shape Recognition Technology (SRT)—Differentiating human beings (e.g. head and shoulder patterns) from objects.

Typical functions and components (e.g. hardware) found in many computer vision systems are described in the following paragraphs. The present embodiments may include at least some of these aspects. For example, with reference to FIGS. 5, 7, and 8, in various embodiments of the present premises security system, A/V devices 130, 630, 800 may include a computer vision module 502, 861. The computer vision module 502, 861 may include any of the components (e.g. hardware) and/or functionality described herein with respect to computer vision, including, without limitation, one or more cameras, sensors, and/or processors. In some embodiments, the microphone 104, the camera 102, and/or the camera processor 170 may be components of the computer vision module 502, 861.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the computer vision module 502, 861. A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a many core DSP (digital signal processor). But, like video processing units, vision processing units may have a focus on low precision fixed point arithmetic for image processing.

With reference to FIG. 19, information received by the computer vision module 502, 861 of the A/V device may be sent to one or more network devices, such as the network(s) of servers and backend devices 108 (FIG. 1), in a computer vision query signal 1910. The one or more network devices may then analyze the sent information and/or compare the sent information with other information in one or more databases to detect a region of interest, such as a human face. As noted above, in some embodiments, computer vision processing may be performed to perform facial recognition, i.e., to identify a detected human face as being associated with a specific identified human. In various embodiments, the network device, such as the server 118 and/or the backend API 120 (FIG. 1), may send a computer vision response signal 1912 to the A/V device. The computer vision response signal 1912 may include one or more of: an identification of the visitor; an indication whether the visitor is known or unknown; one or more determined attributes of the visitor; and data reflecting a determined reaction of the visitor to audio content played back to simulate occupancy.

Figures 20, 21:
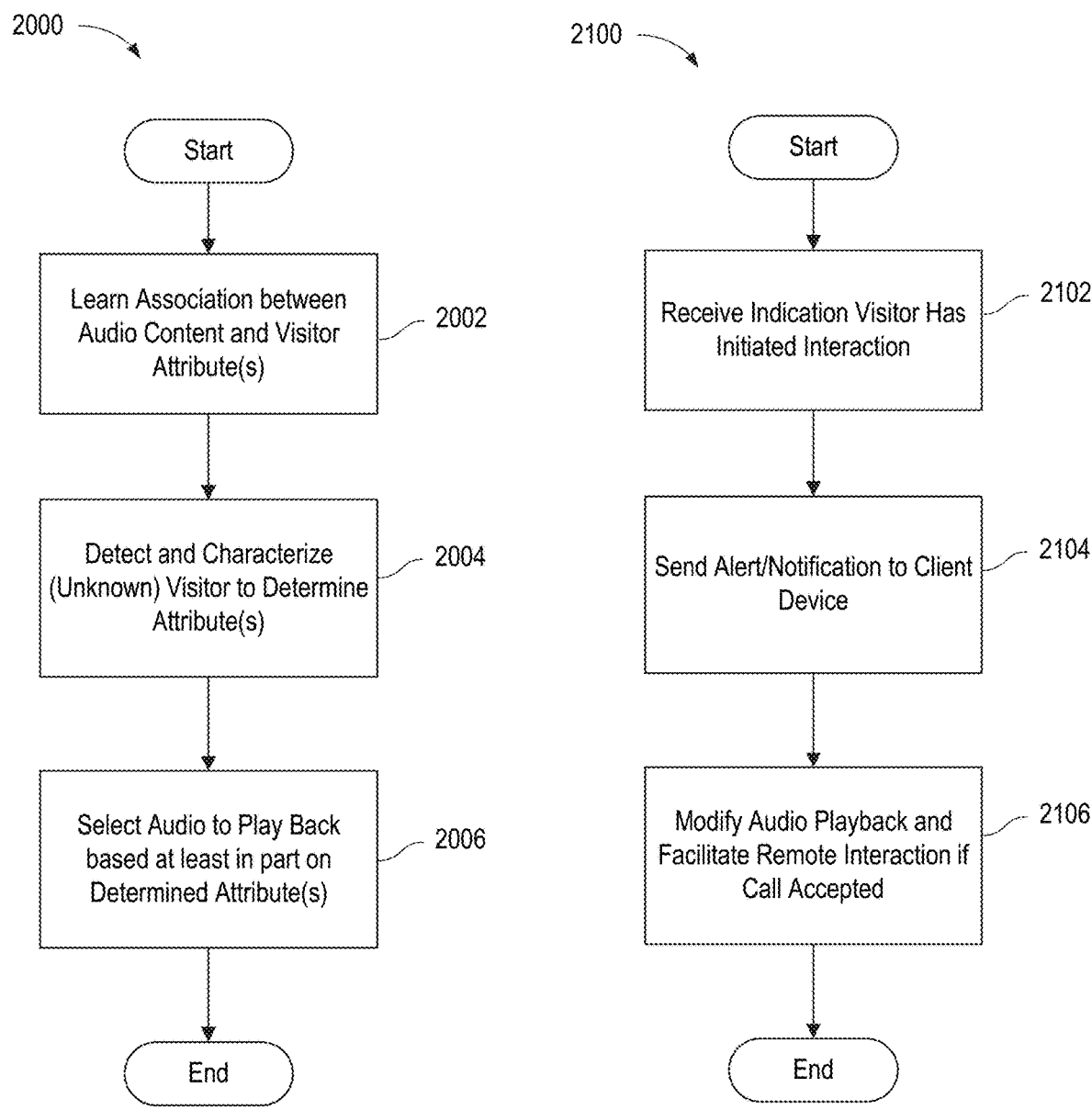
FIGS. 20 and 21 are flowcharts illustrating processes for providing audio content simulating occupancy according to aspects of the present disclosure.

FIG. 20 is a flowchart illustrating a process 2000 for providing audio content simulating occupancy according to an aspect of the present disclosure. In various embodiments, the process 2000 of FIG. 20 may be performed by one or more processors comprising one or both of a premises security system and a backend server. Candidate premises security systems include the systems 1200 (FIG. 12) and 1600 (FIG. 16). In the example shown, at block 2002 an association between certain audio content and one or more visitor attributes is learned. For example, at a given premises, or across multiple premises, unknown visitors who are children may be observed to respond differently than adults to a given audio content, such as a barking dog, a group of adult voices in conversation, as at a dinner party or other adult gathering, etc. At block 2004, an unknown visitor is detected and one or more attributes of the visitor determined. For example, the camera 1208 and/or the camera 1608 may capture an image of the visitor 1214, and the processor 1232 may implement computer vision techniques of the software 1235 to detect one or more attributes of the visitor 1214. At block 2006, an audio track is selected for playback based at least in part on a previously-learned association between the audio track and the determined attribute of the visitor.

FIG. 21 is a flowchart illustrating a process 2100 for providing audio content simulating occupancy according to an aspect of the present disclosure. In various embodiments, one or more steps of the process 2100 of FIG. 21 may be performing using and/or with respect to an A/V device at the protected premises. At block 2102 an indication is received that a visitor has initiated interaction. For example, the visitor may have depressed a call button on a doorbell-style A/V device. At block 2104, an alert or other notification is sent to a client device associated with the premises, such as a mobile phone or other mobile device. The alert or other notification may invite the user to accept and start a live remote "call" interaction with the visitor, e.g., via a microphone and speaker of the A/V device. At block 2106, playback of audio content simulating occupancy is modified based at least in part on an indication that the call has been accepted. For example, playback may be paused as the call is set up and remains ongoing. Once the call ends, audio playback may resume and continue until the visitor is determined to have left the premises. In some embodiments, the authorized user may be prompted via the client device to indicate whether and/or when playback of audio content simulating occupancy should resume.

Figure 22:
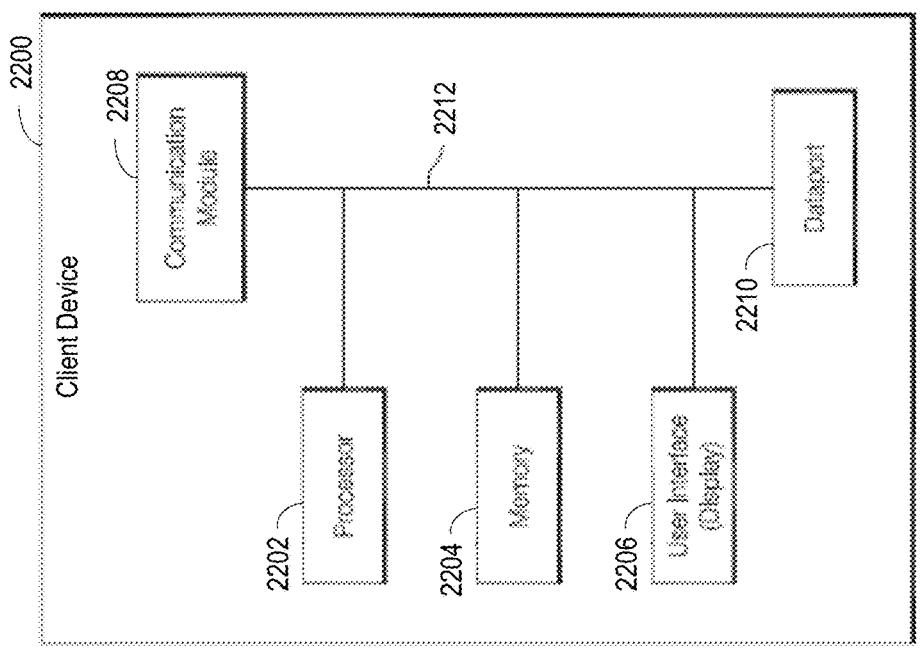
FIG. 22 is a functional block diagram of a client device on which the present embodiments may be implemented according to various aspects of the present disclosure.

FIG. 22 is a functional block diagram of a client device on which aspects of the present embodiments may be implemented according to various aspects of the present disclosure. For example, in some embodiments, block 2104 of FIG. 21 may be performed using a client device such as client device 2200. With reference to FIG. 22, the client device 2200 includes a processor 2202, a memory 2204, a user interface 2206, a communication module 2208, and a dataport 2210. These components are communicatively coupled together by an interconnect bus 2212. The processor 2202 may include any processor used in smartphones and/or portable computing devices, such as an ARM processor (a processor based on the RISC (reduced instruction set computer) architecture developed by Advanced RISC Machines (ARM).). In some embodiments, the processor 2202 may include one or more other processors, such as one or more conventional microprocessors, and/or one or more supplementary co-processors, such as math co-processors.

The memory 2204 may include both operating memory, such as random access memory (RAM), as well as data storage, such as read-only memory (ROM), hard drives, flash memory, or any other suitable memory/storage element. The memory 2204 may include removable memory elements, such as a CompactFlash card, a MultiMediaCard (MMC), and/or a Secure Digital (SD) card. In some embodiments, the memory 2204 may comprise a combination of magnetic, optical, and/or semiconductor memory, and may include, for example, RAM, ROM, flash drive, and/or a hard disk or drive. The processor 2202 and the memory 2204 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 2202 may be connected to the memory 2204 via the dataport 2210.

The user interface 2206 may include any user interface or presentation elements suitable for a smartphone and/or a portable computing device, such as a keypad, a display screen, a touchscreen, a microphone, and a speaker. The communication module 2208 is configured to handle communication links between the client device 2200 and other, external devices or receivers, and to route incoming/outgoing data appropriately. For example, inbound data from the dataport 2210 may be routed through the communication module 2208 before being directed to the processor 2202 and outbound data from the processor 2202 may be routed through the communication module 2208 before being directed to the dataport 2210. The communication module 2208 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 2210 may be any type of connector used for physically interfacing with a smartphone and/or a portable computing device, such as a mini-USB port or an IPHONE®/IPOD® 30-pin connector or LIGHTNING® connector. In other embodiments, the dataport 2210 may include multiple communication channels for simultaneous communication with, for example, other processors, servers, and/or client terminals.

The memory 2204 may store instructions for communicating with other systems, such as a computer. The memory 2204 may store, for example, a program (e.g., computer program code) adapted to direct the processor 2202 in accordance with the present embodiments. The instructions also may include program elements, such as an operating system. While execution of sequences of instructions in the program causes the processor 2202 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 23:
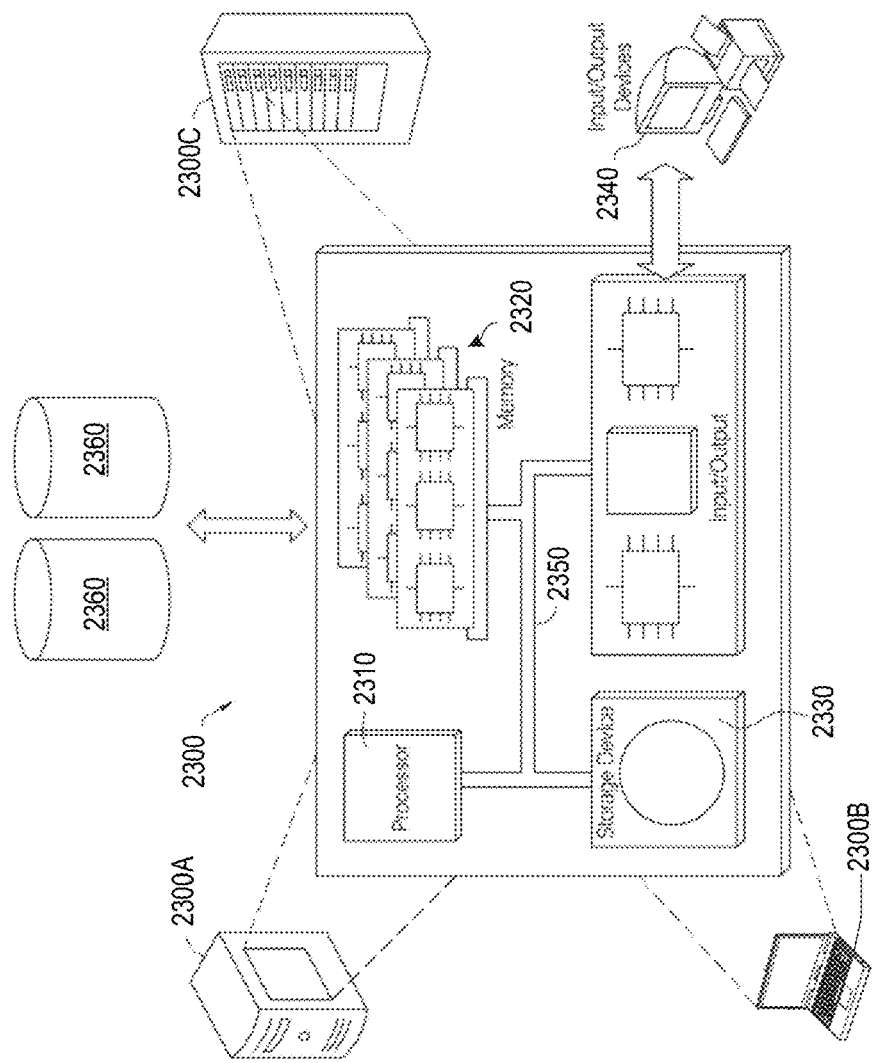
FIG. 23 is a functional block diagram of a general-purpose computing system on which the present embodiments may be implemented according to various aspects of the present disclosure.

FIG. 23 is a functional block diagram of a general-purpose computing system on which the present embodiments may be implemented according to various aspects of the present disclosure. The computer system 2300 may be embodied in at least one of a personal computer (also referred to as a desktop computer) 2300A, a portable computer (also referred to as a laptop or notebook computer) 2300B, and/or a server 2300C. A server is a computer program and/or a machine that waits for requests from other machines or software (clients) and responds to them. A server typically processes data. The purpose of a server is to share data and/or hardware and/or software resources among clients. This architecture is called the client—server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 2300 may execute at least some of the operations described above. The computer system 2300 may include at least one processor 2310, memory 2320, at least one storage device 2330, and input/output (I/O) devices 2340. Some or all of the components 2310, 2320, 2330, 2340 may be interconnected via a system bus 2350. The processor 2310 may be single- or multi-threaded and may have one or more cores. The processor 2310 may execute instructions, such as those stored in the memory 1620 and/or in the storage device 2330. Information may be received and output using one or more I/O devices 2340.

The memory 2320 may store information, and may be a computer-readable medium, such as volatile or non-volatile memory. The storage device(s) 2330 may provide storage for the system 2300, and may be a computer-readable medium. In various aspects, the storage device(s) 2330 may be a flash memory device, a hard disk device, an optical disk device, a tape device, or any other type of storage device.

The I/O devices 2340 may provide input/output operations for the system 2300. The I/O devices 2340 may include a keyboard, a pointing device, and/or a microphone. The I/O devices 2340 may further include a display unit for displaying graphical user interfaces, a speaker, and/or a printer. External data may be stored in one or more accessible external databases 2360.

Figure 24:
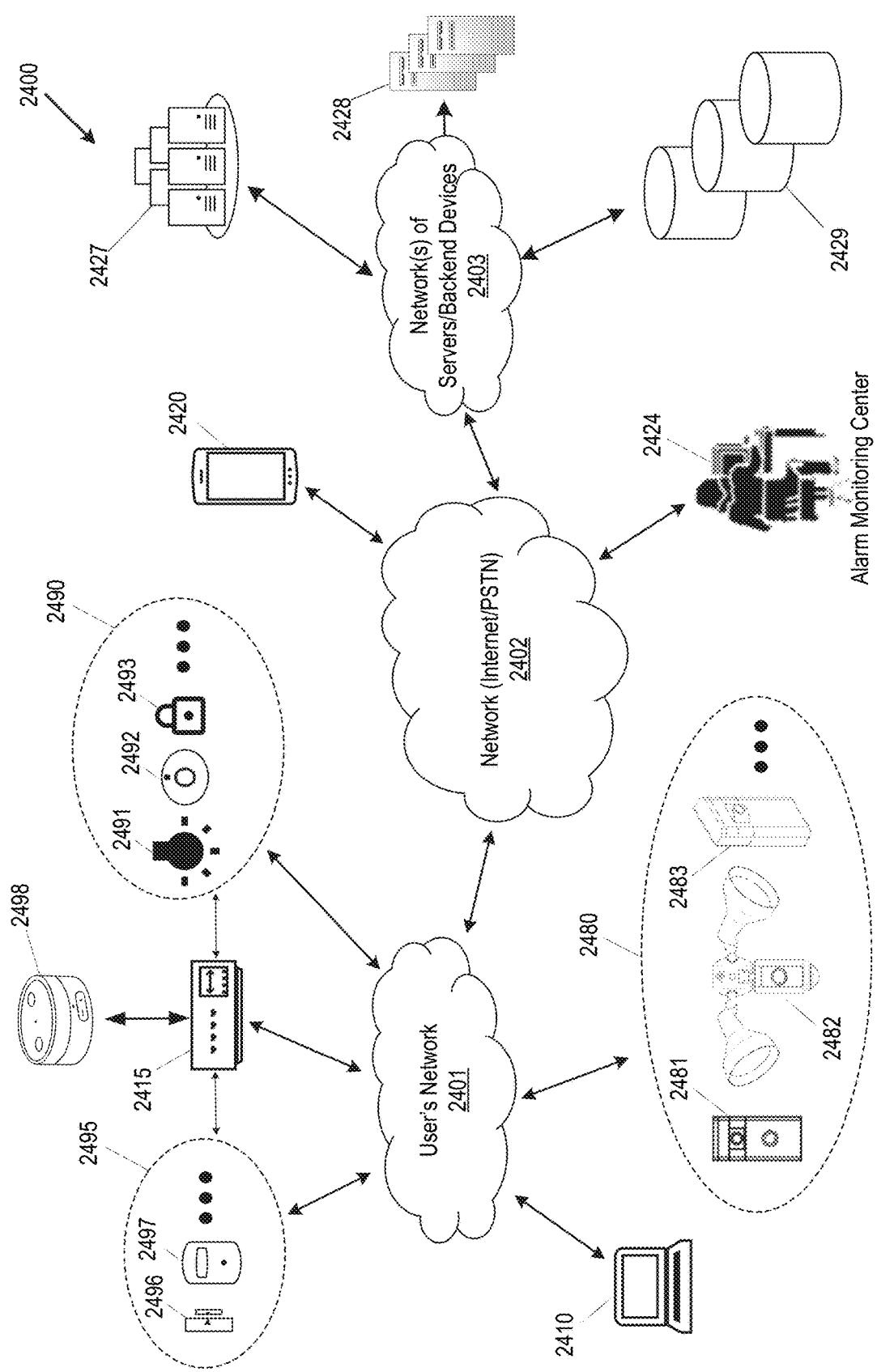
FIG. 24 is a functional block diagram illustrating a system for communication between user devices connected to a user's network and remote servers and other remote devices connected to other networks according to various aspects of the present disclosure.

FIG. 24 is a functional block diagram illustrating a system 2400 for communication between several user devices connected to a user's network (e.g., a home network) 2401, and remote servers and other remote devices connected to other networks 2402, 2403. Specifically, the user's network 2401, in some of the present embodiments, may include a hub device 2415, security/alarm devices 2495, a virtual assistant (VA) device 2498, and smart home devices 2490 (each of which is associated with the hub device 2415), client device(s) 2410, and audio/video (A/V) recording and communication devices 2480 (A/V devices 2480). An alarm monitoring center 2424 and a client device 2420, among other entities and devices, may be connected to the public network 2402. Additionally, the backend network 2403 may include several backend devices, such as one or more remote storage devices 2429, one or more servers 2428, and one or more backend application programming interfaces (APIs) 2427. Any of the embodiments described herein, including those described above with reference to FIGS. 11-21, may be implemented with a system such as the system 2400 illustrated in FIG. 24 and described below. The hub device 2415 and/or the VA device 2498 may alternatively be referred to as a gateway, a controller, a home-automation hub, a communication hub, a network device, or an intelligent personal assistance device. In certain embodiments, the hub device 2415 and the VA device 2498 may be combined as a single device.

The user's network 2401 may be, for example, a wired and/or wireless network (e.g., Ethernet network, Wi-Fi network, ZigBee network, Z-Wave network, etc.). Alternatively, or in addition, the user's network 2401 may comprise various networks such as a cellular/mobile network, a local network, a public network, a low-bandwidth network, and/or any other appropriate network. If the user's network 2401 is wireless, or includes a wireless component, the network 2401 may be a Wi-Fi network compatible with the IEEE 802.11 standard and/or other wireless communication standard(s).

As shown in FIG. 24, the user's network 2401 is connected to another network 2402, which may comprise, for example, the Internet and/or a public switched telephone network (PSTN). As described below, the security/alarm devices 2495, the smart home devices 2490, and the A/V devices 2480 may communicate with the client devices 2410, 2420 via the network 2401 and the network 2402 (Internet/PSTN). In various embodiments, any or all of the hub device 2415, the VA device 2498, the security/alarm devices 2495, the smart home devices 2490, and the A/V devices 2480 may communicate with the client devices 2410, 2420 directly (e.g., using one or more wireless technologies and/or protocols, such as Bluetooth, Bluetooth LE, ZigBee, Z-Wave, etc.). The network 2402 may be any wireless network or any wired network, or a combination thereof, configured to operatively couple the above-mentioned modules, devices, and systems as shown in FIG. 24. For example, the network 2402 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection.

With further reference to FIG. 24, the hub device 2415, in some of the present embodiments, may comprise any device that facilitates communication with and control of the security/alarm devices 2495, the smart home devices 2490, and the VA device 2498. In some aspects of the present embodiments, the hub device 2415 may also facilitate communication with and control of the A/V devices 2480. The hub device 2415 may be powered by a connection to an external power source (e.g., AC mains). Additionally, the hub device 2415 may include an internal backup battery to which the hub device 2415 switches when the external power is disconnected.

The security/alarm devices 2495, the smart home devices 2490, and/or the VA device 2498, in some of the present embodiments, may communicate with the hub device 2415 directly (e.g., using one or more wireless technologies and/or protocols, such as Bluetooth, Bluetooth LE, ZigBee, Z-Wave, etc.) and/or indirectly (e.g., via the user's network 2401). In some of the present embodiments, the A/V devices 2480 may communicate with the hub device 2415 through one or more networks (e.g., the user's network 2401 and the network 2402). Although not shown in FIG. 24, in some embodiments, the hub device 2415 may communicate directly with the A/V devices 2480 (e.g., via wired and/or wireless channels). The hub device 2415 may include any or all of the components and/or functionality of the security hub component 1302 described above with reference to FIG. 13.

With continued reference to FIG. 24, the security/alarm devices 2495 may include, but are not limited to, monitoring sensors, such as contact sensors 2496 (e.g., door sensors, window sensors, etc.), motion sensors 2497, noise detectors (not shown), glass-break sensors (not shown), and/or other similar intrusion detection sensors. These sensors (or detectors) may be used for monitoring and/or detecting unauthorized entry into a property. As will be described in more detail below, when any of the security/alarm devices 2495 are tripped (or triggered), the sensor may immediately transmit an intrusion event signal to the hub device 2415 via a communication path (e.g., a wireless and/or wired channel).

The smart home devices 2490 may include, but are not limited to, indoor/outdoor lighting systems (e.g., smart light emitting diodes (LEDs) 2491), temperature control systems (e.g., thermostats 2492), locking control systems for doors and/or windows (e.g., smart locks 2493), shade/blind control systems (not shown), or any other automation (or smart home) devices that can communicate with, and be controlled by, the hub device 2415.

In some of the present embodiments, the hub device 2415 may be a component of a home automation system installed at a property of a user who is associated with the client devices 2410, 2420. Home automation, or smart home, is building automation for the home. It involves the control and automation of various devices and/or systems, such as lighting, heating (such as smart thermostats), ventilation, air conditioning (HVAC), blinds/shades, and security, as well as home appliances, such as washers/dryers, ovens, or refrigerators/freezers. Wi-Fi is often used for remote monitoring and control. The smart home devices 2490 and the security/alarm devices 2495, when remotely monitored and controlled via the network (Internet/PSTN) 2402, may be considered to be components of the Internet of Things. The home automation system may use one or more communication technologies and/or protocols, including either or both of wired and wireless protocols, including but not limited to Wi-Fi, X10, Ethernet, RS-485, 6LoWPAN, BTLE, ZigBee, and Z-Wave.

The smart home devices 2490 and the security/alarm devices 2495 may be controlled via a user interface in some of the present embodiments. The user interface may include any or all of a wall-mounted terminal, software installed on the client devices 2410, 2420 (e.g., a mobile application), a tablet computer or a web interface, and may communicate with Internet cloud services. The user interface may be a user interface of the hub device 2415 and/or the VA device 2498. In addition to communicating with, and/or controlling, the smart home devices 2490 and the security/alarm devices 2495, in various embodiments, the client devices 2410, 2420 may also be in network communication with, and/or controlling, at least one of the A/V devices 2480 (e.g., via the networks 2401 and 2402) and the VA device 2498. The client devices 2410, 2420 may comprise, for example, a mobile phone such as a smartphone, or a computing device such as a tablet computer, a laptop computer, a desktop computer, etc. The client devices 2410, 2420 may include any or all of the components and/or functionality of the client device 2200 described above with reference to FIG. 22.

With further reference to FIG. 24, the system 2400 may also include one or more A/V devices 2480 (e.g., installed at the same property where the security/alarm devices 2495 and smart home devices 2490 are installed). The A/V devices 2480 may include, but are not limited to, video doorbells 2481, lighting systems with A/V capabilities (e.g., a floodlight camera 2482, spotlight cameras (not shown), etc.), security cameras 2483, or any other similar devices. The structure and functionality of the A/V devices 2480 are described above with reference to FIGS. 3-10. As described above, in some embodiments, the user may control the A/V devices 2480 using either or both of the client devices 2410, 2420. Additionally, in some embodiments, the user may control the A/V devices 2480 through the hub device 2415 (e.g., using either or both of the client devices 2410, 2420). In some embodiments, however, the client devices 2410, 2420 may not be associated with an A/V device. The floodlight camera 2482 is an example of the A/V device 100 (FIG. 1).

As described above, a user may control the smart home devices 2490, the security/alarm devices 2495, and/or the A/V devices 2480, using one or more applications executing on a client device of the user (e.g., the client device 2420). For example, the user may turn on/off the lights 2491, may turn up/down the temperature using the thermostat 2492, may lock/unlock the doors and windows through the locks 2492, etc. The user may also arm/disarm one or more of the security/alarm devices 2495 (and one or more of the A/V devices 2480) using the client devices 2410, 2420.

With further reference to FIG. 24, the system 2400 may also include one or more remote storage devices 2429 (may be referred to interchangeably as "cloud storage device(s)"), one or more servers 2428, and one or more backend application programming interfaces (APIs) 127 that are connected to network 2403. The network 2403 may be similar in structure and/or function to the above-described user's network 2401. The hub device 2415 (and in some embodiments the hub's associated security/alarm devices 2495 and smart home devices 2490) and/or the A/V devices 2480 may communicate with, and be managed by, the remote servers 2428 and APIs 2427 through the networks 2401, 2402, and 2403. Examples of such communications are described below.

While FIG. 24 illustrates the storage devices 2429, the servers 2428, and the backend APIs 2427 as components of the network 2403 and separate from the network 2402, in some aspects of the present embodiments, one or more of the storage devices 2429, the servers 2428, the backend APIs 2427, and the VA device 2498 may be components of the network 2402. Additionally, in some embodiments, the storage devices 2429 may be separate from the backend servers 2428 or may be an integral component of the backend servers 2428. Any of the backend APIs 2427 may comprise, for example, a server (e.g., a real server, or a virtual machine, or a machine running in a cloud infrastructure as a service), or multiple servers networked together, exposing at least one API to client(s) accessing it. These servers may include components such as application servers (e.g., software servers), depending upon what other components are included, such as a caching layer, or database layers, or other components. A backend API may, for example, comprise many such applications, each of which communicate with one another using their public APIs. In some embodiments, the backend API may hold the bulk of the user data and offer the user management capabilities, leaving the clients to have very limited state.

Each of the backend APIs 2427 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API may ease the work of programming graphical user interface (GUI) components. For example, an API may facilitate integration of new features into existing applications (a so-called "plug-in API"). An API may also assist otherwise distinct applications with sharing data, which can help to integrate and enhance the functionalities of the applications.

Each of the backend APIs 2427 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components may both run on the same machine. Clients and servers may have a user interface, and sometimes other hardware associated with them.

With continued reference to FIG. 24, the system 2400 may also include the security/alarm monitoring center 2424. In some embodiments, each time the hub device 2415 receives an intrusion alert signal from one or more of the security/alarm devices 2495 (e.g., when one or more of the sensors 2496 and/or 2497 are triggered), the hub device 2415 may send a security breach signal to the security/alarm monitoring center 2424. In addition to the hub device 2415, the A/V devices 2480 of some embodiments may also send a security breach signal to the security/alarm monitoring center 2424 when these devices determine that an emergency situation has occurred. For example, when one of the A/V devices 2480 (e.g., the floodlight camera 2482) detects a suspicious person and/or activity in an area about the location of the A/V device, the device may send a security breach signal to the alarm monitoring center 2424.

The security/alarm monitoring center 2424 (e.g., an operator of the center) may, in turn, dispatch civil authorities to investigate the monitored premises and/or may send other types of notifications, including, but not limited to, text messages, such as SMS (Short Message Service) messages, MMS (Multimedia Messaging Service) messages, email messages, voice messages (either live or recorded), etc. to one or more client devices of a user, such as the client devices 2410, 2420. Typically, when the security/alarm monitoring center 2424 does not receive an acknowledgment from the user, or receive an acknowledgment in which the user informs the center of an emergency situation (e.g., the user is away from home), the monitoring center may contact an emergency call center (not shown in the communication system 2400). The emergency call center may comprise a local 911 call center that serves a region in which the hub device 2415 is located. The emergency call center may also be reached by the client devices 2410, 2420, and/or the backend devices 2427, 2428 directly (e.g., using a PSTN) or indirectly (e.g., through the networks 2401, 2402, and 2403).

In some alternative embodiments, the security monitoring center 2424 may not be a separate entity different from the backend servers 2428 (and/or the backend APIs 2427). For example, in some of the present embodiments, the backend servers 2428 may monitor the home security/alarm devices 2495 and/or the hub device 2415 (and other security systems not shown in the figures) in addition to managing the hub device 2415 and/or the A/V devices 2480.

As illustrated in FIG. 24, the system 2400 may include the VA device 2498. The VA device 2498 may be connected to the user's network 2401 and/or the network (Internet/PSTN) 2402. The VA device 2498 may include an intelligent personal assistant, such as, without limitation, Amazon Alexa® and/or Apple Siri®. For example, the VA device 2498 may be configured to receive voice commands, process the voice commands to determine one or more actions and/or responses (e.g., transmit the voice commands to the one or more components of the network of servers/backend devices 2403 for processing), and perform the one or more actions and/or responses, such as to activate and/or change the status of one or more of the sensors 2496/2497 and A/V devices 2480. In some embodiments, the VA device 2498 is configured to process user inputs (e.g., voice commands) without transmitting information to the network of servers/backend devices 2403 for processing. The VA device 2498 may include at least one speaker (e.g., for playing music, for outputting the audio data generated by the A/V devices 2480, for outputting the voice of a digital assistant, etc.), at least one a microphone (e.g., for receiving commands, for recording audio data, etc.), and a display (e.g., for displaying a user interface, for displaying the image data generated by the A/V devices 2480, etc.). In various embodiments, the VA device 2498 may include an array of speakers that are able to produce beams of sound. Although illustrated as a separate component in FIG. 2, in some embodiments the VA device 2498 may not be a separate component from the hub device 2415. In such embodiments, the hub device 2415 may include the functionality of the VA device 2498 or the VA device 2498 may include the functionality of the hub device 2415.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a backend component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

In various embodiments, techniques as disclosed herein may provide increased security by providing audio content to simulate occupancy, even when the premises is not actually occupied.

Although the foregoing embodiments have been described in some detail for purposes of clarity of understanding, the invention is not limited to the details provided. There are many alternative ways of implementing the invention. The disclosed embodiments are illustrative and not restrictive.

In a first aspect, a premises security system for providing audio simulating occupancy of a protected premises includes (i) a presence sensor for detecting presence of a person near the protected premises and (ii) at least one of a security hub component and a virtual assistant (VA) device communicatively coupled with the presence sensor. Either or both of the security hub component and the VA device include: a microphone for capturing sound within the protected premises, a speaker for playing sound within the protected premises, an audio driver for driving the speaker, a storage device, a memory, and at least one processor coupled to the microphone, the speaker, the audio driver, and the storage device. The memory stores machine-readable instructions that, when executed by the processor, control the processor to: capture, using the microphone, audio content of sounds within the protected premises when occupied, store the audio content in the storage device, and control the audio driver to play the audio content through the speaker in response to receiving an indication, from the presence sensor, of the presence of the person near the protected premises.

In an embodiment of the first aspect, the memory stores further machine-readable instructions that, when executed by the processor, control the processor to: associate a first audio content with a first location within the protected premises, associate a second audio content with a second location within the protected premises, and control the audio driver to play the first audio content through the speaker positioned at the first location and to play the second audio content through another speaker positioned at the second location.

In a second aspect, a premises security system includes a sensor, a speaker, a microphone, a memory, and at least one processor coupled to the sensor, the speaker, and the microphone. The memory stores machine-readable instructions that, when executed by the processor, control the processor to: capture, using the microphone, audio content of sounds within the protected premises when occupied, store the audio content in the storage device, and control the audio driver to play the audio content through the speaker in response to receiving an indication, from the presence sensor, of the presence of the person near the protected premises In an embodiment of the second aspect, the premises security system also includes a plurality of speakers, including the speaker, each communicatively coupled to the processor, and machine-readable instructions. When executed by the processor, the machine-readable instructions further cause the system to play the audio content in a manner that simulates movement of a sound source between locations about a premises at which the premises security system is located.

In an embodiment of the second aspect, the premises security system also includes a plurality of speakers, including the speaker, each communicatively coupled to the processor, and machine-readable instructions. When executed by the processor, the machine-readable instructions further cause the system to determine a current location of the visitor and play the audio content in a manner that simulates movement of the sound source between locations within a structure of a premises at which the premises security system is located, including by selecting at least one of the speakers for playback of the audio content based at least in part on the current location of the visitor.

In an embodiment of the second aspect, the premises security system also includes machine-readable instructions that, when executed by the processor, further cause the system to play the audio content in a manner that simulates movement of the sound source between locations within the structure of a premises at which the premises security system is located at least in part by selecting the at least one of the speakers for playback of the audio content such that the at least one of the speakers is not visible from the current location of the visitor.

In an embodiment of the second aspect, the premises security system also includes machine-readable instructions that, when executed by the processor, further cause the system to record and characterize ambient sounds detected by the microphone for playback at a later time as the audio content.

In an embodiment of the second aspect, the premises security system also includes machine-readable instructions that, when executed by the processor, further cause the system to record the ambient sounds during a time in which a premises at which the premises security system is located is occupied.

In an embodiment of the second aspect, the microphone is an indoor microphone.

In an embodiment of the second aspect, the premises security system also includes machine-readable instructions that, when executed by the processor, further cause the system to receive an indication that the visitor has initiated interaction and pause playback of the audio content. Pausing the playback of the audio content is based at least in part on an indication that an authorized user associated with a premises at which the premises security system is located has accepted the request to engage in the interaction.

In an embodiment of the second aspect, the premises security system also includes machine-readable instructions that, when executed by the processor, further cause the system to determine that the visitor has left the premises and resume playback of the audio content after the visitor has left the premises.

In an embodiment of the second aspect, the premises security system also includes machine-readable instructions that, when executed by the processor, further cause the system to prompt the authorized user to resume playback of the audio content.

In an embodiment of the second aspect, the sensor includes a camera and the system further includes machine-readable instructions that, when executed by the processor, further cause the system to process an image captured by the camera to determine an attribute of the visitor, and select the audio content for playback based at least in part on the determined attribute.

In an embodiment of the second aspect, in which the speaker is a first speaker at a first location within the premises, the premises security system also includes a second speaker at a second location within the premises and machine-readable instructions that, when executed by the processor, further cause the system to play the audio content on the first speaker during a first time-interval, and play the audio content on the second speaker during a second time-interval.

In a third aspect, a method of providing audio content simulating occupancy includes detecting, with a premises security system in an armed operational state, presence of a visitor at a premises at which the premises security system is located; and detecting, using a microphone of the premises security system, a sound level associated with the visitor. The method also includes determining, based at least in part on the sound level associated with the visitor, a volume at which to play audio content; and driving one or more speakers of the premises security system to play the audio content at the volume.

In an embodiment of the third aspect, the method also includes determining a current location of the visitor, and playing the audio content in a manner that moves the sound source between locations within a structure of the premises. In this embodiment, the method also includes selecting a current playback location, for playing the audio content, based at least in part on the current location of the visitor.

In an embodiment of the third aspect, the method also includes selecting the current playback location such that the current playback location is not visible from the current location of the visitor.

In an embodiment of the third aspect, the method also includes receiving an indication that the visitor has initiated interaction, and pausing playback of the audio content based at least in part on an indication that an authorized user associated with the premises has accepted the request to engage in the interaction.

In an embodiment of the third aspect, the method also includes determining that the visitor has left the premises, and resuming playback of the audio content after the visitor has left the premises.

In an embodiment of the third aspect, wherein detecting the presence of the visitor includes capturing an image of the visitor, the method also includes: determining, from the image, an attribute of the visitor, and selecting the audio content for playback based at least in part on the determined attribute.

What is claimed is:

1. A premises security system for providing audio simulating occupancy of a protected premises, comprising:
   a presence sensor for detecting presence of a person near the protected premises;
   at least one of a security hub component and a virtual assistant (VA) device communicatively coupled with the presence sensor, either or both of the security hub component and the VA device having:
   a microphone for capturing sound within the protected premises;
   a plurality of speakers for playing sound within the protected premises;
   an audio driver for driving the plurality of speakers;
   a storage device;
   at least one processor coupled to the microphone, the speaker, the audio driver, and the storage device; and
   a memory storing machine-readable instructions that, when executed by the processor, control the processor to:
      capture, using the microphone, audio content of sounds within the protected premises when occupied;
      store the audio content in the storage device; and
      in response to receiving an indication, from the presence sensor, of the presence of the person near the protected premises, control the audio driver to play the audio content through the plurality of speakers in a manner that simulates movement of a sound source between locations about the protected premises.

2. The premises security system of claim 1, wherein the memory stores further machine-readable instructions that, when executed by the processor, control the processor to:
   associate a first audio content with a first location within the protected premises;
   associate a second audio content with a second location within the protected premises; and
   control the audio driver to play the first audio content through the speaker positioned at the first location and to play the second audio content through another speaker positioned at the second location.

3. A premises security system, comprising:
   a sensor;
   a plurality of speakers;
   a microphone;
   at least one processor coupled to the sensor, the speaker, and the microphone; and
   a memory storing machine-readable instructions that, when executed by the processor, control the processor to:
      detect, using the microphone, a sound level associated with a human visitor;
      determine, based at least in part on the sound level associated with the human visitor, a volume at which to play audio content simulating occupancy using the speaker; and
      play the audio content in a manner that simulates movement of a sound source between locations about a premises at which the premises security system is located.

4. The premises security system of claim 3, further comprising:
   a plurality of speakers, including the speaker, each communicatively coupled to the processor; and
   machine-readable instructions that, when executed by the processor, further cause the system to
      determine a current location of the human visitor; and
      play the audio content in a manner that simulates movement of the sound source between locations within a structure of a premises at which the premises security system is located, including by selecting at least one of the speakers for playback of the audio content based at least in part on the current location of the human visitor.

5. The premises security system of claim 4, further comprising machine-readable instructions that, when executed by the processor, further cause the system to play the audio content in a manner that simulates movement of the sound source between locations within the structure of a premises at which the premises security system is located at least in part by selecting the at least one of the speakers for playback of the audio content such that the at least one of the speakers is not visible from the current location of the human visitor.

6. The premises security system of claim 3, further comprising machine-readable instructions that, when executed by the processor, further cause the system to record and characterize ambient sounds detected by the microphone for playback at a later time as the audio content.

7. The premises security system of claim 6, further comprising machine-readable instructions that, when executed by the processor, further cause the system to record the ambient sounds during a time in which a premises at which the premises security system is located is occupied.

8. The premises security system of claim 7, wherein the microphone is an indoor microphone.

9. The premises security system of claim 3, further comprising machine-readable instructions that, when executed by the processor, further cause the system to:
  receive an indication that the human visitor has initiated interaction; and
  pause playback of the audio content based at least in part on an indication that an authorized user associated with a premises at which the premises security system is located has accepted the request to engage in the interaction.

10. The premises security system of claim 9, further comprising machine-readable instructions that, when executed by the processor, further cause the system to:
  determine that the human visitor has left the premises; and
  resume playback of the audio content after the human visitor has left the premises.

11. The premises security system of claim 9, further comprising machine-readable instructions that, when executed by the processor, further cause the system to prompt the authorized user to resume playback of the audio content.

12. The premises security system of claim 3, wherein the sensor includes a camera, the system further comprising machine-readable instructions that, when executed by the processor, further cause the system to:
  process an image captured by the camera to determine an attribute of the human visitor; and
  select the audio content for playback based at least in part on the determined attribute.

13. The premises security system of claim 3, wherein the speaker is a first speaker at a first location within the premises, the premises security system further comprising a second speaker at a second location within the premises and machine-readable instructions that, when executed by the processor, further cause the system to:
  play the audio content on the first speaker during a first time-interval; and
  play the audio content on the second speaker during a second time-interval.

14. A method of providing audio content simulating occupancy, the method comprising:
  detecting, with a premises security system in an armed operational state, presence and current location of a human visitor at a premises at which the premises security system is located;
  detecting, using a microphone of the premises security system, a sound level associated with the human visitor;
  determining, based at least in part on the sound level associated with the human visitor, a volume at which to play audio content simulating occupancy; and
  driving one or more speakers of the premises security system to play the audio content, simulating occupancy at the volume and in a manner that moves the sound source between locations within a structure of the premises by selecting a current playback location based at least in part on the current location of the human visitor.

15. The method of claim 14, further comprising selecting the current playback location such that the current playback location is not visible from the current location of the human visitor.

16. The method of claim 14, further comprising:
  receiving an indication that the human visitor has initiated interaction; and
  pausing playback of the audio content based at least in part on an indication that an authorized user associated with the premises has accepted the request to engage in the interaction.

17. The method of claim 16, further comprising:
  determining that the human visitor has left the premises; and
  resuming playback of the audio content after the human visitor has left the premises.

18. The method of claim 14, wherein detecting the presence of the human visitor includes capturing an image of the human visitor, the method further comprising:
  determining, from the image, an attribute of the human visitor; and
  selecting the audio content for playback based at least in part on the determined attribute.

* * * * *